United States Patent
Dailey

(10) Patent No.: US 9,120,286 B2
(45) Date of Patent: Sep. 1, 2015

(54) FIBER OPTIC SENSOR THERMALLY MATCHED SUPPORT TUBES FOR DISTRIBUTED FIBER OPTIC SENSING

(75) Inventor: George Franklin Dailey, Pittsburgh, PA (US)

(73) Assignee: FOS LLC, Pittsburgh, PA (US)

( * ) Notice: Subject to any disclaimer, the term of this patent is extended or adjusted under 35 U.S.C. 154(b) by 247 days.

(21) Appl. No.: 13/558,094

(22) Filed: Jul. 25, 2012

(65) Prior Publication Data

US 2013/0028555 A1    Jan. 31, 2013

Related U.S. Application Data

(60) Provisional application No. 61/572,867, filed on Jul. 25, 2011.

(51) Int. Cl.
| | |
|---|---|
| G02B 6/00 | (2006.01) |
| B32B 1/00 | (2006.01) |
| B32B 1/08 | (2006.01) |
| B32B 7/02 | (2006.01) |
| G01K 11/32 | (2006.01) |
| G01D 5/353 | (2006.01) |

(52) U.S. Cl.
CPC ... *B32B 1/00* (2013.01); *B32B 1/08* (2013.01); *B32B 7/02* (2013.01); *G01D 5/35358* (2013.01); *G01K 11/32* (2013.01); *G01K 11/3206* (2013.01); *G02B 6/00* (2013.01); *Y10T 428/13* (2015.01); *Y10T 428/24942* (2015.01)

(58) Field of Classification Search
CPC ............. B32B 7/02; B32B 1/00; B32B 1/08; G02B 6/00; Y10T 428/24942; Y10T 428/13; G01K 11/3206; G01K 11/32; G01D 5/35358
USPC ............ 385/14, 16, 147, 12; 372/6; 428/34.1, 428/212, 312.8, 304.4, 311.51
See application file for complete search history.

(56) References Cited

U.S. PATENT DOCUMENTS

| | | | |
|---|---|---|---|
| 3,405,516 A * | 10/1968 | Laureti | 57/211 |
| 3,451,305 A * | 6/1969 | Johnson et al. | 87/6 |
| 5,550,629 A | 8/1996 | Shapanus et al. | |
| 5,760,516 A | 6/1998 | Baumann et al. | |
| 5,974,317 A | 10/1999 | Djuknic et al. | |
| 6,233,384 B1 * | 5/2001 | Sowell et al. | 385/107 |
| 6,449,293 B1 * | 9/2002 | Pedersen et al. | 372/6 |
| 6,587,188 B2 | 7/2003 | Gleine et al. | |

(Continued)

OTHER PUBLICATIONS

Fabien Ravet; Submillimeter Crack Detection With Brillouin-Based Fiber-Optic Sensors; IEEE Sensors Journal, vol. 9, No. 11, Nov. 2009.

*Primary Examiner* — Akm Enayet Ullah
(74) *Attorney, Agent, or Firm* — James Ray & Assoc.

(57) ABSTRACT

Distributed fiber optic sensor includes a composite support tube that closely matches the coefficient of thermal expansion of the optical sensing fiber contained therewithin for applications including but not limited to Rayleigh back-scattering, (OFDR, Optical Frequency Domain Reflectometry), Brillouin frequency shift (BOTDA, Brillouin Optical Time Domain Analysis, BOTDR, Brillouin Optical Time Domain Reflectometry), Raman (Optical Time Domain Reflectometry), DPP-BOTDA (Differential Pulse Pair Brillouin Optical Time Domain Analysis), Dual-Index BOTDA, PCF (Photonic Crystalline Fibers), and dense packed Fiber Bragg Gratings, both time and wave length modulated are described in detail.

23 Claims, 14 Drawing Sheets

(56) References Cited

U.S. PATENT DOCUMENTS

| | | |
|---|---|---|
| 6,721,470 B2 | 4/2004 | Bosselmann et al. |
| 6,886,977 B2 | 5/2005 | Kaminski et al. |
| 7,169,465 B1 * | 1/2007 | Karandikar et al. ....... 428/312.8 |
| 7,174,075 B2 | 2/2007 | Drubel et al. |
| 7,379,632 B1 | 5/2008 | Twerdochlib |
| 7,599,047 B2 | 10/2009 | Zou et al. |
| 8,076,909 B2 | 12/2011 | Diatzikis et al. |
| 8,098,967 B1 | 1/2012 | Bazzone |
| 2003/0108286 A1 * | 6/2003 | Albert ............................ 385/37 |
| 2008/0036336 A1 | 2/2008 | Salem et al. |
| 2012/0026482 A1 | 2/2012 | Dailey |
| 2013/0028555 A1 * | 1/2013 | Dailey ........................... 385/12 |

* cited by examiner f = coefficient of friction

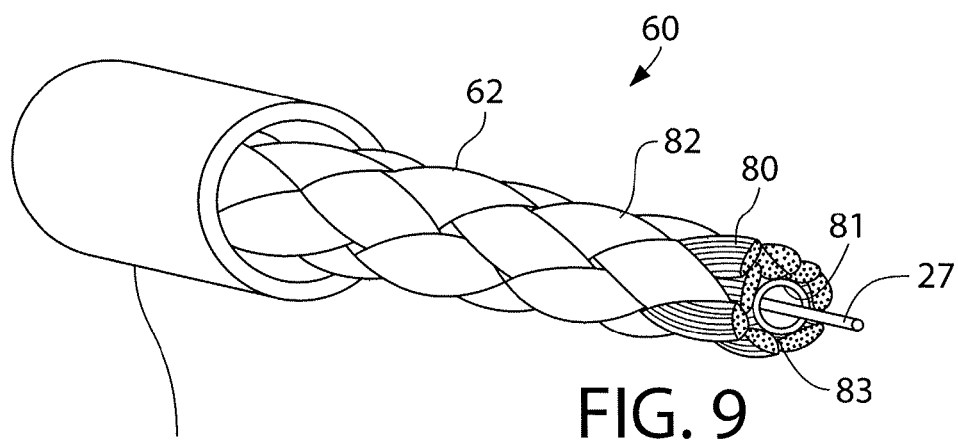
FIG. 9
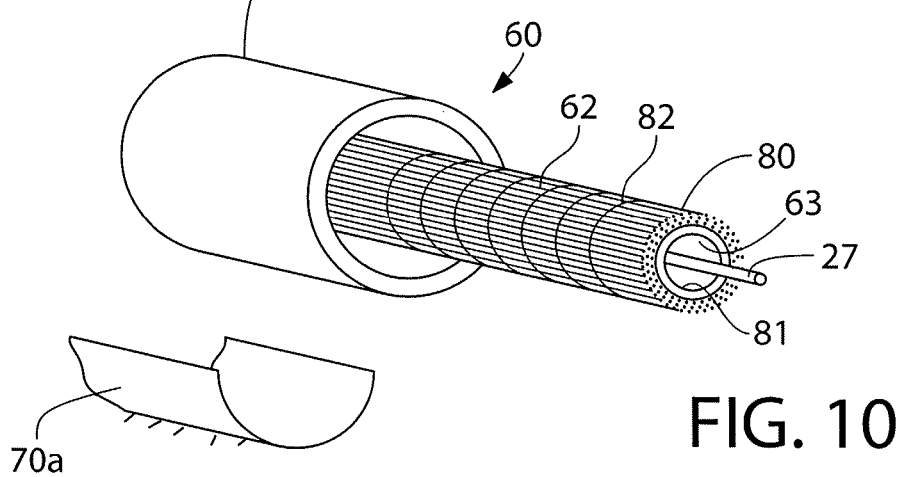
FIG. 10
FIG. 33
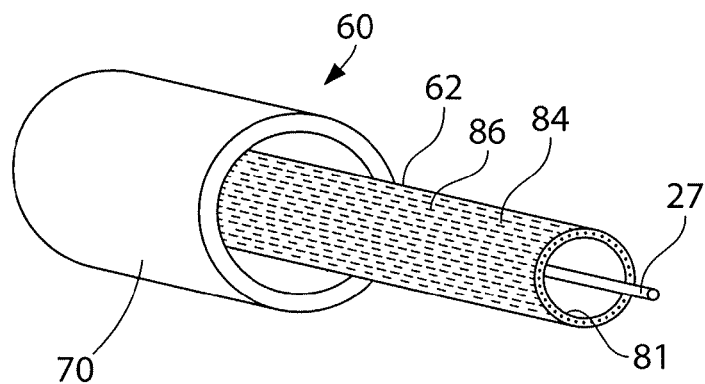
FIG. 11

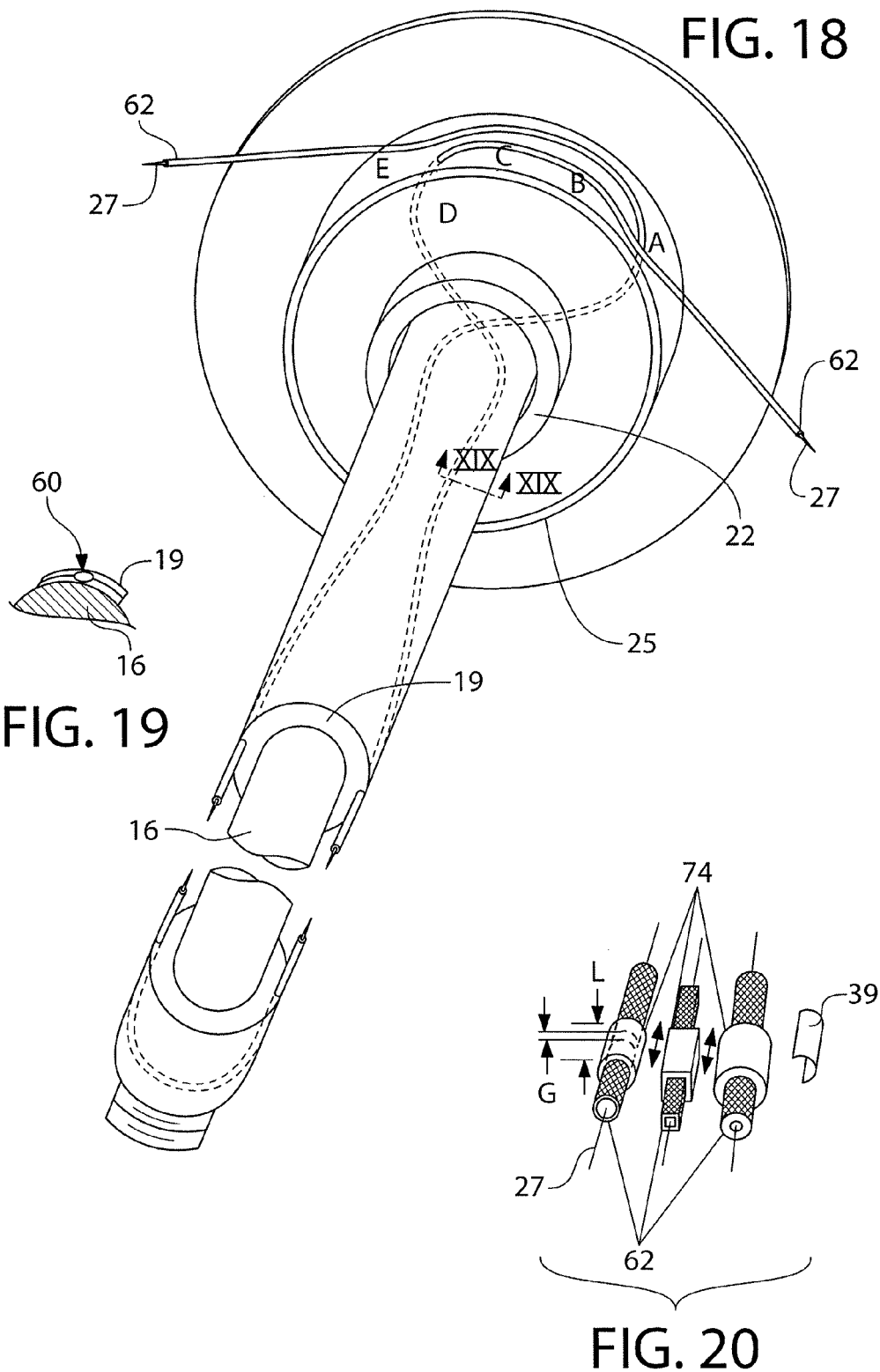

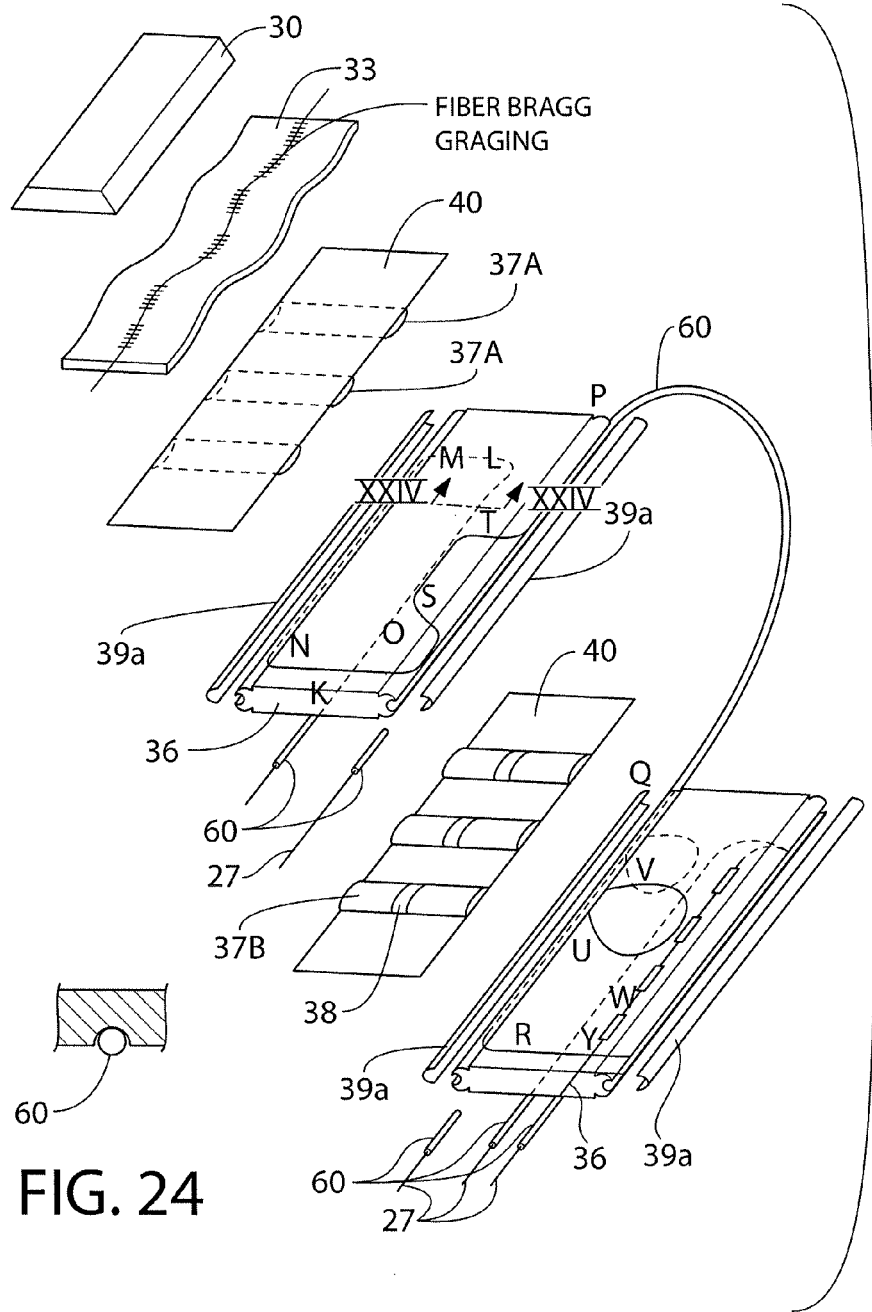

FIBER OPTIC SENSOR THERMALLY MATCHED SUPPORT TUBES FOR DISTRIBUTED FIBER OPTIC SENSING

CROSS-REFERENCE TO RELATED APPLICATIONS

This application is related to and claims priority from U.S. Provisional Patent Application Ser. No. 61/572,867 filed on Jul. 25, 2011. This application is also closely related to U.S. regular Utility patent application Ser. No. 13/065,842 filed on Mar. 31, 2011 by inventor of the instant invention and titled "Use of fiber optic sensor techniques for monitoring and diagnostics of large AC generators". Teaching of the U.S. regular Utility patent application Ser. No. 13/065,842 is incorporated in this document by reference thereto.

FIELD OF THE INVENTION

The present invention relates, in general, to fiber optic sensors and, more particularly, this invention relates to a fiber optic sensors having thermally matched support member encasing at least one strand of optical fiber, yet more particularly, the instant invention relates to fiber optic sensors employing thermally matched support member for use in electric generators.

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

BACKGROUND OF THE INVENTION

As is generally well known, distributed fiber optic sensors employ a strand of optical sensing fiber encased within a tubular support member, commonly manufactured from Teflon or like materials. It is further generally known that the Brillouin frequency shift which is commonly referred to as Brillouin Optical Time Domain Analysis (BOTDA) has been widely used for civil engineering structures such as rail lines, which was the first application, and then later for bridges, dams, tunnels, border security, pipelines, oil wells, mainly long most straight runs in which a local change from the baseline was to be scanned and identified. The entire long run would not suddenly experience a large temperature change which would cause a large differential expansion between the optical fiber and its support tube, which due to a stick slip phenomenon would then tend to concentrate the temperature measurement errors at certain points. Also, to the best knowledge of the Inventor, the prior art literature contains no mention of the dramatically increased friction multiplication that occurs between an optical sensing fiber and its support tubular member, particularly due to thermal expansion and contraction. Add to that the smaller but still significant effect of static attraction between the optical fiber and a Teflon tube and the temperature error is magnified further, but due to historical use in the civil structures noted, was apparently not found to be a major problem. Prior to the conception and development of the instant inventions, fiber optics sensors were also at least contemplated large electric generators.

The large electric generator found in the field of electric power generation includes a stator core formed by an overlapping stack of thin electrical grade sheets of iron laminations which are coated with suitable insulation to electrically insulate each lamination from contiguous laminations in order to minimize electrical losses. These laminations when properly stacked and aligned are then clamped together under high compression and so arranged to form a series of equally spaced, uniform stator slots. The clamping force may be provided by a series of through bolts and building bolts equally spaced and extending through a series of equally spaced holes located at the mean radius and a second set of equally spaced semi-circular arcs at the outer diameter. The holes at the mean radius contain long stainless steel and electrically insulated bolts, appropriately called through bolts. The bolts on the outer diameter are usually not insulated, but are in some designs, and are referred to as building bolts. Some manufacturers do not ground the stator core and, therefore, the outer clamping members (building bolts) may be insulated as well. The clamped stator core slots contain close fitting, well confined electrical windings consisting of a wound series of bottom coils and top coils, which is referred to as the winding.

The inter-laminar resistance of all electrical steel stator laminations is measured approximately every five years by the Electromotive Core Imperfection Detector (EL-CID) maintenance test. This test requires a temporary loop of wire to be drawn through the air-gap between the stator and non-rotating rotor. The generator must be off-line for the test. The core is then excited at 60 Hz and other frequencies of interest and a coil of wire (test coil) is pulled through the air gap along the inside diameter of the stator core, which is commonly referred to as the tooth top. By means of a test coil and a reference coil, the inter-laminar resistance of each lamination is then evaluated by electronic means that compares the amplitude and phase shift between the EL-CID test coil and the reference coil. This test is very effective at locating electrical shorts between adjacent laminations except for the non grounded stator cores. In that case a lamination would have to have two shorts within its expanse for the EL-CID to detect a problem. With a grounded core a single short can be detected. A second method to evaluate stator core inter-laminar resistance is to remove the rotor, install a very heavy current carrying member at the geometric center, apply a heavy 60 Hz current to this center conductor, which encircles the entire machine, and then energize the conductor in order to excite the core to full magnetic excitation, and finally look for "hot spots" with an infrared imaging device. When a hot spot is found with either method, the inter-laminar clamping force is reduced and wedges are used to separate the shorted laminations enabling mica insulation to be placed between the shorted laminations thereby restoring stator core electrical insulation integrity. Unfortunately, the long time between stator core integrity tests has resulted in too much insulation degradation between inspections with the inevitable core failure, which then requires stripping the winding from the core, a full or partial restack of the stator laminations, followed with a complete rewind of the electrical machine. There is one monitor that is used on hydrogen cooled machines, called a core monitor, which is designed to detect ions given off to the hydrogen gas when the core overheats and injects these ions into the hydrogen cooling gas. However, many areas are not directly exposed to the hydrogen gas, such as the stator coil slot area between radial vents. Also, some units are cooled only with axial vent holes and have no radial vents. This creates a sealed area around all the stator coils within the stator core making ion release from these areas very limited.

The core monitor needs to be quite sensitive to be effective and many times it will give a "false alarm." In some situations, the core monitor will signal a problem, the operator will shut down the machine, open a cover and crawl inside and inspect what is visible. If nothing is visibly overheated or obviously burned, they usually return the unit to service, risking an eventual stator core failure that was there but hidden from view. Other times the machine continues running and the problem is found during the maintenance inspection described above. If stator core alarms and subsequent crawl through inspections fail to isolate the cause, many operators will simply turn off the core monitor and take the risk of an eventual stator core failure.

Another maintenance check that is always done in parallel with the EL-CID is stator core inter-laminar tightness, which involves measuring the residual tension in the through bolts and building bolts. This is done by means of hydraulic torque wrenches or a hydraulic bolt tensioning tool. If the stator core laminations are not sufficiently tight, the magnetic forces will cause stator lamination tooth tops or vent fingers, which are the mechanical spacers in the radial vents, to vibrate. This vibration has in many instances caused pieces of laminations and vent fingers to break off, becoming loose parts, and, as a direct consequence, cause a short to ground within the core. This happens because cooling gas windage in conjunction with the magnetic forces can cause these loose pieces to vibrate and wear through the stator coil electrical stator coil ground-wall insulation, creating the short to ground and possibly significant core damage before the relays and breakers can trip the unit off line.

Stator coil wedge tightness is yet another maintenance check that is performed in parallel with EL-CID and stator core inter-laminar tightness. It is important to maintain stator coil tightness at a level that prevents any relative movement within any portion of the stator slot. Stator coil movement is often referred to as slot pounding, which can quickly abrade the stator coil electrical ground-wall insulation leading to a short to ground once the stator coil ground-wall insulation gets too thin or cracks through due to the pounding. The tightness of the stator coils is ascertained by one of two methods. If the rotor is removed, the technician taps on all of the stator coil wedges and listens for "hollow" sounds. If the rotor is installed, a robotic device is driven down the air gap and a small hammer taps on each wedge and the resulting vibration is recorded. Above a certain level of vibration, the wedge is considered loose. If more than five consecutive wedges in a line are all considered loose, they have to be retightened, i.e., re-wedged. If these wedges are inboard, outboard wedges must also be removed to obtain access to the loose inboard wedges. The goal of the maintenance effort is to maintain the compressive state between the stator coils and the stator core slot surfaces from one maintenance interval to the next. If a sufficient number and pattern of wedges are loose, a complete re-wedge of the entire electrical machine is required. Also, a stator core wedge can be tight on one end of the wedge and loose at the other end of this same wedge in which case the wedge is judged to be loose. It should also be noted that if a condition of stator coil vibration has been achieved as disclosed in U.S. patent application Ser. No. 11/503,258 filed on Aug. 14, 2006 and published as US Pub. 2008/0036336 A1 on Feb. 14, 2008, stator coil electrically insulating ground-wall insulation has already been seriously compromised. The purpose of the stator wedge tapping test is to ascertain that the wedges are sufficiently tight to prevent any relative motion (vibration) between the stator core slots and the stator coils contained within these slots. Continuous wedge/coil tightness is required for all sections of the stator coils within the stator core not just the sections of stator coil at the ends of the slots as noted in U.S. Pat. No. 8,076,909 issued to Diatzikis et al. on Dec. 13, 2011. Slot end stator coil vibration is undesirable but stator coil vibration within the great bulk of the stator core is also equally undesirable and is currently measured only by performing electrical generator partial disassembly and using the robotic wedge tap device approximately every five years. If additional fiber Bragg gratings were used according to the method of U.S. Pat. No. 8,076,909, a Fiber Bragg grating (FBG) would be required for each ripple peak and valley (six total per ripple spring) in order to measure the stator coil local tightness due to a single ripple spring, which is the measurement currently performed by the robotic wedge tapping device. With well over one-thousand (1000) top ripple springs in a single generator and six (6) optical fiber Bragg gratings required per top ripple spring, the complete ripple-spring-by-ripple spring stator coil tightness evaluation by means of individual fiber Bragg gratings would be associated with greater than desirable costs. This disadvantage along with the difficulty of trying to link fibers between adjacent top ripple springs as these ripple springs are assembled by wedging and hammering them to a nearly flat condition would require a separate fiber for each top ripple spring, which is too many optical Fiber Bragg Grating-type sensing fibers to consider as a solution. The top ripple springs are also highly stressed thin (0.8 mm) components subject to cracking which makes cutting grooves into the ripple springs and bonding in fiber Bragg gratings a questionable practice. For all of the above enumerated limitations, the invention herein described is proposed.

An addition to the optical sensing capabilities noted in U.S. Pat. No. 8,076,909, the invention herein describes a method to fully measure the operating temperatures of all electrical connections and winding segments within the electric generator. This is needed in order to augment the vibration data mentioned in U.S. Pat. No. 8,076,909 as a critical electrical connector may start to overheat without significant vibratory change just as an electrical connector might change vibration without a corresponding temperature change. Both data sets, vibration and temperature, are fully required to fully diagnose the electric generator operating parameters and for the entire winding to be adequately protected.

As noted in the above referenced prior art references, a distributed fiber optic sensing system is the appropriate system to use considering the high voltages found within the electrical generating machine and the grounding/arcing potential associated with electrically conducting or magnetic materials, such as metallic wires, conduits, and fixtures. The distributed fiber optic systems currently available consist of dense-packed Fiber Bragg gratings, Rayleigh and Ramon back-scattering temperature sensors, and the Brillouin sensors. The Brillouin is further divided into BOTDA, BOTDR, and DPP-DA/Brillouin as well as other special versions of Brillouin. There are also many variations of Raman and Rayleigh back-scattering. For example, many times a FBG will be inserted into a BOTDA optical sensing fiber for various reasons of calibration. These different versions of Brillouin can all measure strain and temperature, some simultaneously, some not. For the purposes of this invention, they are all referred to as Brillouin frequency shift with the understanding that that terminology does not distinguish between the different versions, which is immaterial for the purposes of this invention. Within this collection, the Ramon is primarily for distributed temperature sensing only, whereas the others can quantify both temperature and mechanical strain, when compensation for the combined effect on the sensing fiber optical element(s) due to both temperature and mechanical strain is correctly considered in the construction of the fiber optical element(s). The Raman distributed temperature sensing method is also unique in its utilization of multi-mode fibers, the others primarily employ single mode and/or polarizing maintaining standard optical fibers.

It has been found that due to the geometry of large electric generators, requiring many bends and/or loops and not just straight sections, greater than desirable errors have been measured by using conventional fiber optic sensors.

Therefore, there is a need for an improved distributed fiber optic sensor that at least substantially minimizes if not completely eliminates errors in measuring temperature and/or strain parameters due to environmental friction and/or temperature effects.

SUMMARY OF THE INVENTION

The invention provides fiber optic sensor including a non-conducting, non-magnetic composite tubular support member manufactured from materials that are thermally matched to the thermal expansion characteristics of optical fiber sensing strands contained there within.

As one example, the invention enables the operator of an electric generator to monitor the condition of the stator core and winding portion within the generator stator core using distributed fiber optic sensing corrected for frictional and static charge effects including additional optical fiber-to-supporting tube friction caused by non-straightness of the supporting tube(s). A second feature of the invention enables the operator to monitor the temperature of all electric connectors, such as phase connections, series connections, main lead connections, i.e., all the mechanical connectors which are always found beyond the region of the stator core, again by means of special composite supporting tubes described here in detail. The winding itself between these connections can also be monitored for temperature and mechanical strain.

OBJECTS OF THE INVENTION

It is, therefore, one of the primary objects of the present invention to provide a distributed fiber optic sensor that uses a composite support tube encasing at least one strand of optical fiber.

Another object of the present invention is to provide a distributed fiber optic sensor using a thermally matched composite support tube.

Yet another object of the present invention is to provide a distributed fiber optic sensor that uses a composite support tube manufactured from a combination of a pair of materials, wherein one of the pair of materials having a positive thermal expansion coefficient and an opposite one of the pair of materials having a negative thermal expansion coefficient, and wherein a volume of the material having the positive thermal expansion coefficient is greater than a volume of the material having the negative thermal expansion coefficient.

A further object of the present invention is to provide a distributed fiber optic sensor that uses a composite support tube manufactured from a combination of a pair of materials having different thermal expansion coefficients that are etched or adhered to an exterior surface of another tubular member manufactured from a fluorocarbon based polymer material.

Yet a further object of the present invention is to provide a distributed fiber optic sensor that uses a composite support tube manufactured from a combination of a pair of materials and encased within another tubular member manufactured from a fluorocarbon based polymer material.

An additional object of the present invention is to provide a distributed fiber optic sensor using a composite support tube manufactured from a combination of a pair of materials having different thermal expansion coefficients that is suitable for use on large electric generators.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE DRAWINGS

FIG. 9 shows one embodiment of a composite fiber optic sensing support tube utilizing interlocking structural fiber support matrix;

FIG. 10 illustrates a second embodiment of a composite fiber optic sensing support tube utilizing a combination axial and helical structural fiber support matrix;

FIG. 11 illustrates a third embodiment of a composite fiber optic sensing support tube in which the structural fiber support matrix is integral with the friction reducing element;

FIG. 18 illustrates an AC electric generator through bolt including through bolt not, stainless steel washer, insulating washer, and composite support tube pattern for a fiber optic sensor of FIGS. 6-11, based on Rayleigh back-scattering, but not limited to that method as BOTDA could also be used FIG. 19 is a partial cross-sectional view of the composite fiber optic sensing support tube along lines XIX-XIX of FIG. 18;

FIG. 20 illustrates different shapes of the composite fiber optic sensing support tube of FIGS. 6-11 having both circular and non-circular composite support tubes for the distributed fiber optic sensing fiber within the support tube(s);

FIG. 23 illustrates composite fiber optic sensing support tube of FIGS. 6-11 in combination with modified insulating stator core slot fillers of the AC electric generator for stain and temperature measurement of the stator core iron laminations and stator coils;

FIG. 24 is a partial cross-sectional view along lines XXIV-XXIV of FIG. 23, particularly illustrating the composite fiber optic sensing support tube of FIGS. 6-11 installed into a groove milled into a standard stator core slot filler material;

FIG. 33 illustrates an optional groove that may be employed in securing the distributed fiber optic sensing of the instant invention.

BRIEF DESCRIPTION OF THE VARIOUS EMBODIMENTS OF THE INVENTION

Figure 1:
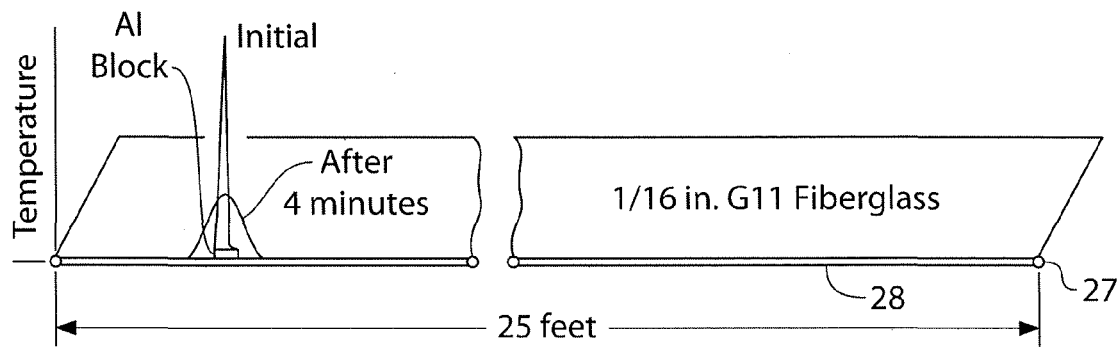
FIG. 1 illustrates long (25-foot) fiberglass shim fiber optic Rayleigh back-scattering test sample fully extended and heated with a hot coupon and also illustrates initial and transient temperatures.

Prior to proceeding to the more detailed description of the present invention, it should be noted that, for the sake of clarity and understanding, identical components which have identical functions have been identified with identical reference numerals throughout the several views illustrated in the drawing figures.

The present invention is illustrated and described in combination with a large AC electric generator, although it will be apparent to those skilled in the relevant art that the present invention may be applied to other devices or structures and as such should not be interpreted as a limiting factor of the distributed fiber optic sensor of the instant invention.

Figure 12:
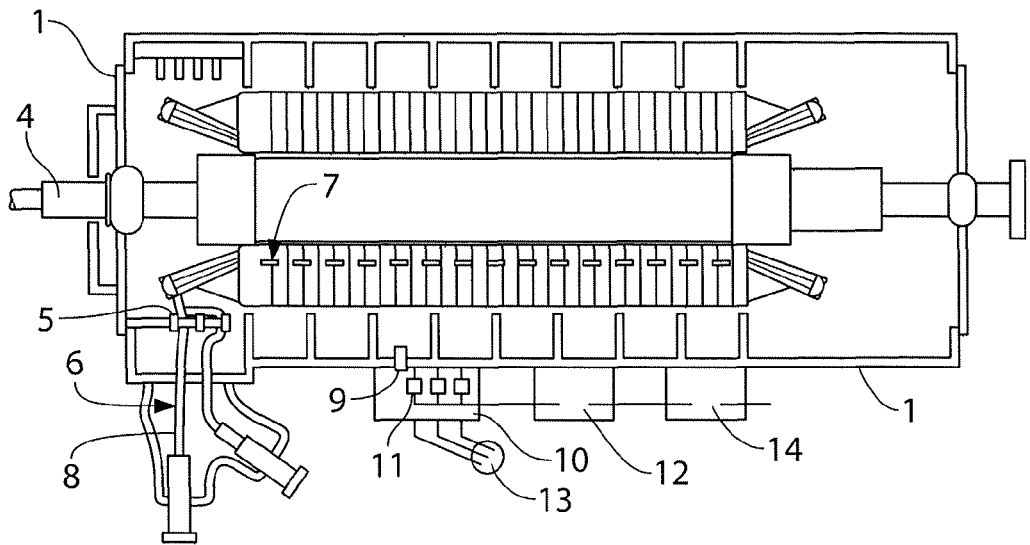
FIG. 12 illustrates a cross section of a typical electric AC generator suitable for use with the composite fiber optic sensing support tube of FIGS. 6-11.
Figure 13:
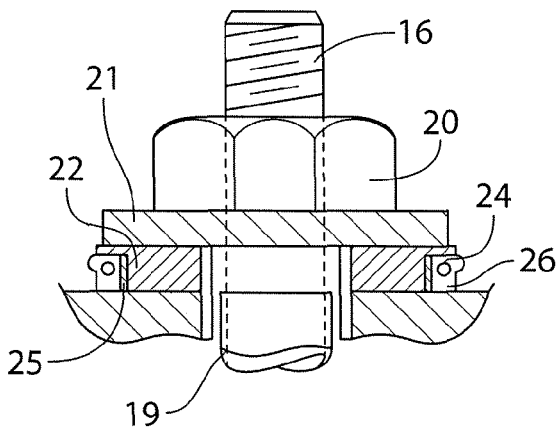
FIG. 13 illustrates a partial cross-sectional view of a fiber Bragg grating installed within a groove in the insulating fiberglass washer of a through bolt and nut arrangement employed in the AC electric generator of FIG. 12.
Figure 14:
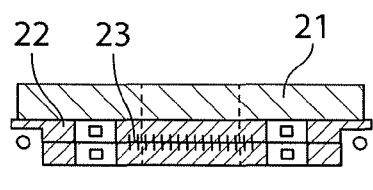
FIG. 14 illustrates a special attachment mechanism for the fiber Bragg grating installed on the through bolt insulating washer of the AC electric generator of FIG. 9 for the purpose of preventing birefringence.

FIG. 12 shows a typical AC electric generator including the frame 1 within which is contained the stator core 2 integral electrically conductive windings showing the end regions 3 and rotor 4 Also shown are the parallel rings 5 which are connected to the main leads (typically six (6)) 6.

Figure 15:
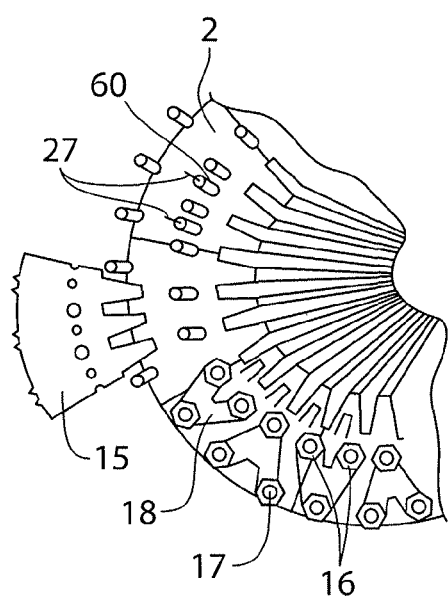
FIG. 15 illustrates additional special holes that can be added to the AC electric generator stator core iron laminations for the purpose of distributed fiber optic sensor temperature measurements using the fiber optic sensors of FIGS. 6-11.

FIG. 15 is an end view of the complete stack of electrical grade steel laminations 15 that are positioned in a circle (generally nine (9) per circumference) and longitudinally staggered (overlapped) to form the massive stator core 2 which consists of individual laminations 15 tightly held and clamped by through bolts 16 and building bolts 17 both equally spaced as shown.

Figure 16:
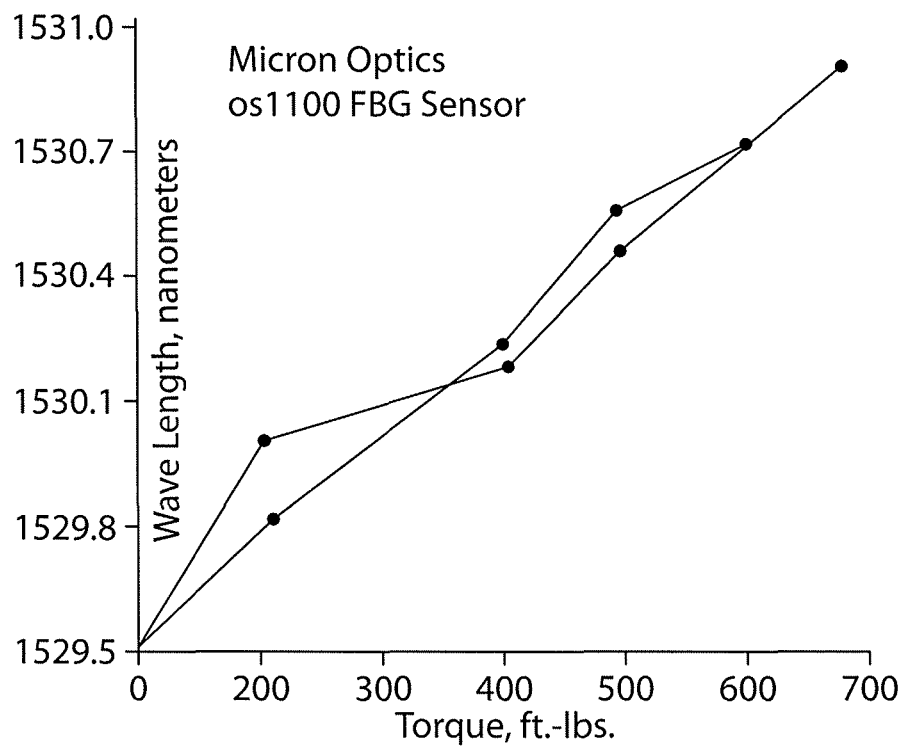
FIG. 16 illustrates Fiber Bragg grating wave length as a function of applied torque for an AC electric generator insulating through bolt fiber optic load sensing washer.
Figure 17:
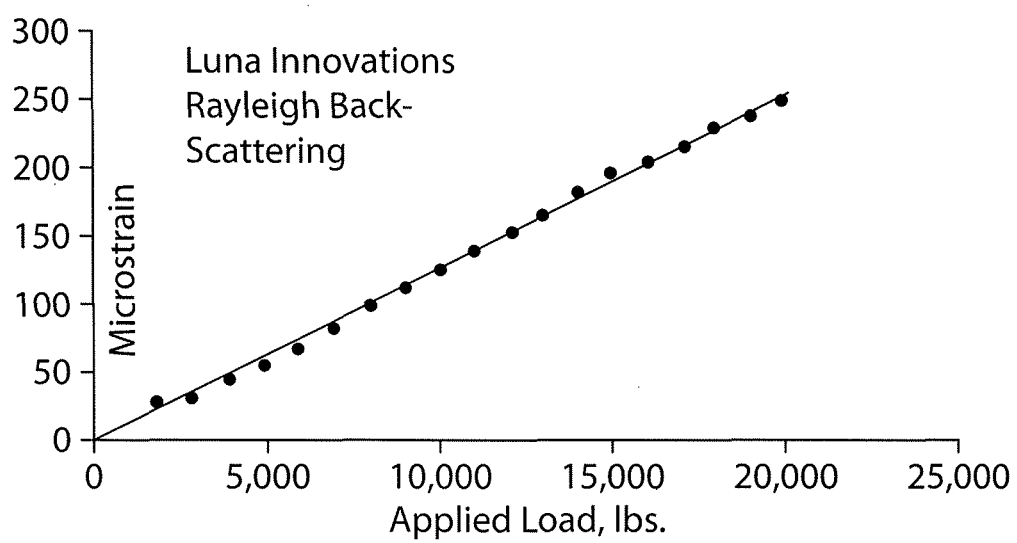
FIG. 17 illustrates measure micro strain as a function of load applied to an AC electric generator insulating through bolt washer fiber optic load cell as measured using Rayleigh back-scattering. It should be noted that BOTDA could also have been employed.

The mechanical clamping force provided by through bolts 16 and building bolts 17 is spread over a given area by means of the core support plates 18. Examining the construction of the through bolt, FIG. 8 shows a stainless steel through bolt 16 which is threaded on bolt ends (one end only shown), which is typically insulated with Nomex insulation 19 in order to isolate the bolt voltage (approximately 1000 volts) from the stator core which is typically grounded to the frame 1 by means of grounded building bolts 17. The through bolt nut 20 when fully tightened loads stainless steel washer 21 which in turn transmits clamping load through the fiberglass insulating washer 22. A typical clamping force is between 50,000 and 80,000 pounds, which creates large hoop and compressive forces in the fiberglass washer 21. In order to measure this force, the fiber optic sensors 23 and 24, that may be configured to at least partially incorporate the distributed fiber optic sensor 60 of the instant invention have been used. As with all fiber optic sensors these are immune to electric voltage and magnetic field effects and can be safely attached to a fiberglass thin ring 25 by appropriate bonding means. The fiberglass ring 25 may be lightly press fit to the fiberglass washer 22 or may be made integral therewith as a one-piece construction. As load is applied to the fiberglass washer 22 its diameter increases and thickness decreases and the fiberglass ring expands and grows larger in diameter and circumference in direct proportion to the load. The fiberglass ring 25 also serves to eliminate compressive loads on the distributed fiber optic sensor which would create birefringence in the response complicating the analysis. By eliminating compressive loads on the fiber optic sensor, commercially available fiber optic sensor laser analysis equipment can be used such as that supplied by Micron Optics which is designed to measure only stretch of wave length multiplexed fiber Bragg gratings. This equipment does not accurately respond when compressive loads are superimposed on lineal stretch of the fiber Bragg grating. The fiberglass ring 25 effectively shields the fiber Bragg grating from the large compressive loads which are present in the fiberglass washer 22, which in turn permits the simplified correlation between reflected wave length change as a function of applied through bolt load. Therefore fiber optic sensor 23 could be a standard fiber Bragg grating and sensor 24 could be either a fiber Bragg grating modified to act as a fiber optic thermocouple as supplied by Micron Optics or it could be a standard fiber Bragg grating contained within a small non-magnetic, non electrically conducting composite tube, such as shown in FIGS. 6-11, both protected from contamination by a non-contacting sealant, such as silicone 25. Both fiber optic sensors would be linked by a common fiber optic cable and two or three more such assemblies would be equally spaced around the circumference all on the same fiber optic cable, equally spaced around the generator circumference. As is best shown in FIGS. 18-20, the fiber optic sensors would also be added to the building bolts and included on a common fiber optic cable allowing simultaneous measurement of through bolt and building bolt loads. Instead of bonding the fiber Bragg grating or fiber optic cable to fiberglass ring 25, the clamps and bolts could be used to secure a thin fiberglass strip to the fiberglass insulating washer. The fiber Bragg grating could then be itself bonded to the thin fiberglass strip. By these alternative means the stator core tightness can be measured at any time, whether on-line, off-line, or under full load and assessment of suitable core tightness obtained periodically without the need for unit disassembly and use of hydraulic means. Reference is made to U.S. Pat. No. 5,974,317 which describes a similar fiber optic load measuring device and which is incorporated into this document by reference thereto. That invention by virtue of its construction would require careful analysis of the birefringence and it should be noted that it is not temperature compensated, which would make it unsuitable for the present invention. The invention described herein has been reduced to practice and a typical curve showing change in wave length for the fiber Bragg grating as a function of mechanical torque applied to the through bolt nut 20 best shown in FIG. 16. Small holes can be added to new factory stator core electrical steel laminations and collinear support structures for the purpose of inserting fiber optic sensors 60 including small non-conducting, non-magnetic composite tube(s) 62 which are thermally matched to the optical sensing fiber 27 for monitoring of operational stator core temperatures with an accuracy equivalent to the EL-CID and thermo-vision tests described above. The accuracy and spatial resolution, of course, depend on the distributed fiber optic sensing laser analyzer selected, Rayleigh, Brillouin, or Raman (temperature only). For a fiber optic sensor 60 proceeding from one small lamination hole to the next, strain may not be of interest, which would allow selection of the Raman distributed fiber optic sensing system for this special case, but the Rayleigh and Brillouin Frequency shift methods could also be used and selected based on what other generator components are selected for monitoring and diagnostics.

In further reference to FIGS. 12-15, a fully distributed fiber optic sensor single mode (SM), polarizing maintaining (PM) cable, or multi mode (MM) cable contained within the winding portion of the stator core 2. A fully distributed fiber optic SM/PM sensor cable for monitoring the end regions (only one end region shown) including all electrical connections among which typically would be found, series, phase, parallel ring, main lead connections, and flexible connectors 8. MM cable would only be used for temperature only measurements via the Raman back-scattering method. It must be noted that the composite fiber optic sensor 60 of FIGS. 6-11 would be utilized for obtaining the most accurate temperature and temperature compensated strain readings possible. A gas-tight frame penetration 9 is required for hydrogen cooled generators in order to conduct all distributed fiber optic sensor cables through the generator frame 1. Outside the generator frame is a sealed distributed fiber optic sensor containment box, "fiber box", 10 (with removable cover) containing all the distributed fiber optic sensor cables required as well as a multiple mechanical fiber optic links 11 for each of the desired and necessary distributed fiber optic sensor cables. The fiber optic mechanical cable connections contained within the fiber box permit various cable layouts to be selected and connected so as to utilize the optimum characteristics of the Rayleigh, Brillouin, and Raman analyzers selected for the site-specific requirements without limiting the characteristics of the special Brillouin/Rayleigh/Raman analyzer selected, thereby providing great operational flexibility. For example, one typical Rayleigh back-scattering laser analyzer (OFDR) has a spatial resolution of 1 mm and a maximum fiber length of seventy (70) meters and a Brillouin laser analyzer has a spatial resolution of 2 mm and a maximum length limitation of two (2) kilometers. A reconfigurable fiber optic sensor cable layout is required to take full advantage of both the Rayleigh and Brillouin and the special cases utilizing Raman back-scattering. Each of the fiber optic link cables proceeds to a fiber optic multiplexor (or fiber optic switch) 12. Alternatively the fiber optic cables could be linked to the control room by means of a single conduit 13. Assuming the operator positions the fiber optic multiplexor 12 on or near the generator frame 1, the laser distributed fiber optic sensor laser analyzer 14 could be positioned on the frame 1. Each of the distributed fiber optic sensor means described herein has different fiber-length limitations, which, in turn, are a function of the spatial resolution achievable by means of the distributed fiber optic sensor laser analyzer selected. Therefore, when the generator control room is physically close to the electric generator, the operator may chose to locate the multiplexor 12 and laser analyzer 14 in the control room irrespective of the analysis method selected which would require use of the fiber optic conduit 13. Therefore, the decision concerning the location of the multiplexor 12 and laser analyzer 14 has to be considered as site specific and both locations for these two invention components should be considered as equal embodiments of the invention.

During the process of developing a practical application consistent with the invention described in U.S. regular Utility patent application Ser. No. 13/065,842 filed on Mar. 31, 2011 by inventor of the instant invention and titled "Use of fiber optic sensor techniques for monitoring and diagnostics of large AC generators", a greater than desirable error was discovered in temperature measurements and indirectly with strain measurements that require optical temperature compensation.

Figure 2:
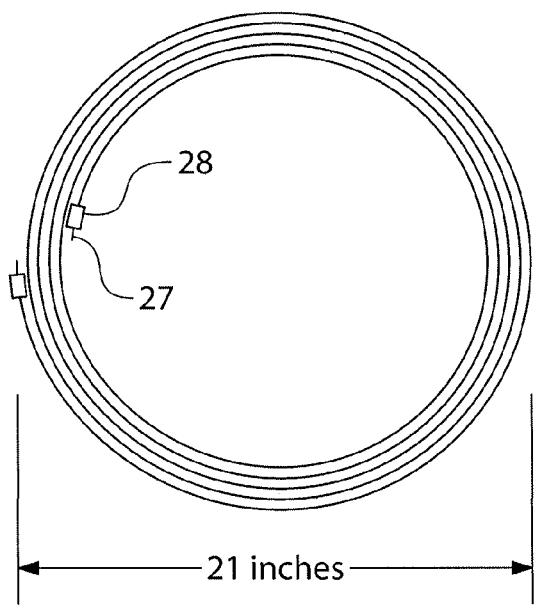
FIG. 2 illustrates a long (25-foot) fiberglass shim fiber optic BOTDA test sample coiled and heated prior to heating in an environmental oven to equilibrium.
Figure 3:
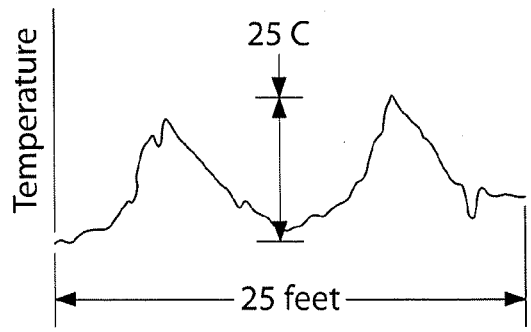
FIG. 3 illustrates equilibrium temperatures for the long (25-foot) fiberglass shim fiber optic BOTDA test sample of FIG. 2 and further demonstrate the temperature error due to non-straightness of the distributed optical sensing fiber in the Teflon tube.
Figure 4:
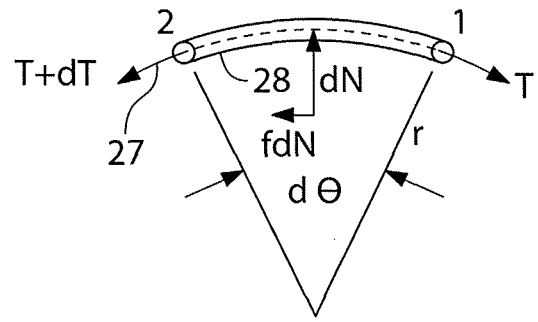
FIG. 4 illustrates differential elements consisting of a fiber optic sensor support tube which contains a non-bonded distributed fiber optic sensing cable along with the differential forces.
Figure 5:
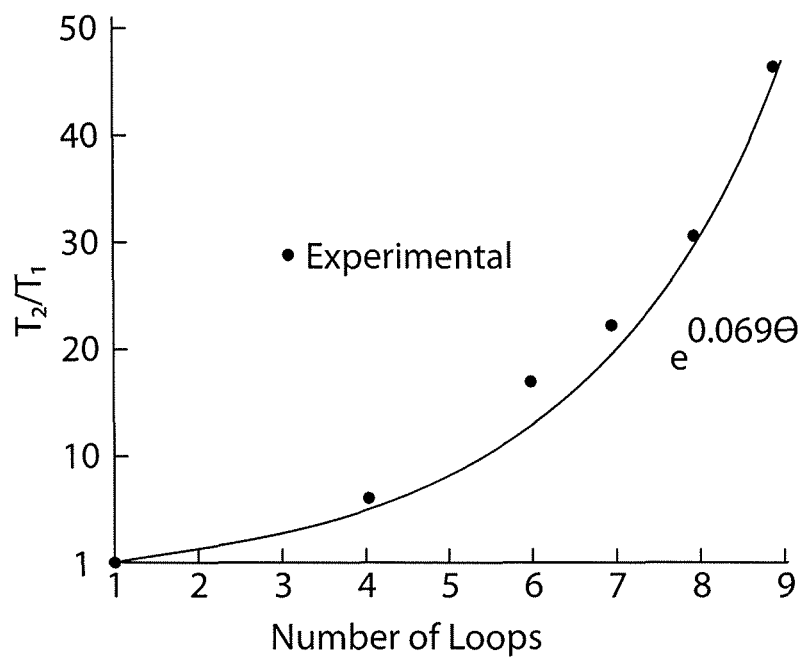
FIG. 5 illustrates theoretical and experimental fiber tension ration as a function of subtended angle (number of loops)

In order to explain the source of the temperature measurement error, reference is made to FIGS. 1-3, which is a twenty-five (25) foot test sample tested by Luna Innovations of Blacksburg, Va. (Luna). The sample contains a single standard single mode polyimide coated fiber (27) contained within conventional PEEK and Teflon tubes (28) which are joined so as to be continuous and these tubes are in turn bonded to a groove milled into a twenty-five (25) foot, 1/16 inch thick fiberglass strip shown in FIG. 1. To test the thermal distributed response of this twenty-five (25) foot sample, it was simply laid out straight on the floor and hot aluminum strips were then placed on the strip and the response recorded means of the Luna Innovations DSS4600 Rayleigh back-scattering laser analyzer. These results are also shown in FIG. 1 and show the initial temperature spike and the location of the temperature increase corresponding to the position where the hot aluminum strips were placed. This result demonstrates the excellent spatial resolution of the Luna Innovations DSS4600. In the test various hot aluminum coupons were placed on the twenty-five (25) foot sample but only one result is shown in FIG. 1. Also shown in FIG. 1 is the rapid temperature decay typical of a thin aluminum strip and the rapid heat transfer to both the fiberglass test strip and the surrounding room temperature atmosphere. These transient temperature results shown in FIG. 1 were considered to be very good proof of principle results for the Luna Innovations Rayleigh back-scattering (OFDR) temperature analysis. As a check on overall accuracy of the method, the twenty-five (25) foot test strip was coiled to a seventeen (17) inch diameter in order to fit it into an environmentally controlled oven in which the entire test piece could be heated uniformly to a controlled temperature. The results were very poor and totally unexpected. In fact, the temperature measurement error was so large (about 150 F) that the results were not even recorded as the DSS4600 unit accuracy was initially questioned. At about the same time as the Luna Innovations test a test of a similar twenty-five (25) foot fiberglass test piece very similar to the Luna Innovations test piece was built and tested by OzOptics of Ottawa, Ontario, Canada (OzOptics). In this test the sample was coiled to 21 inches outside diameter, as shown in FIG. 2, and placed in their environmental oven and the OzOptics results were documented and are shown in FIG. 3. It is important to note that OzOptics uses the Brillouin frequency shift (BFS, BOTDA) method to analyze a standard single mode fiber for temperature/strain variation which is completely different technology compared to Luna Innovation's Rayleigh back-scattering method. In the Luna and OzOptics tests the fiber was similar polyimide coated single mode fiber that was drawn and coated by two different manufacturers. The slight fiber difference is immaterial as both methods measure and record a baseline measurement of the optical parameters at room temperature, which is then used to measure the temperature change from the baseline readings all along the fiber. The optical fiber was also checked to make sure it was still free to slide within the various tubing sections. The temperature measurement errors found for both the Rayleigh back-scattering and Brillouin frequency shift temperature/strain analysis would also be found with long dense packed Fiber Bragg grating wave length modulated or time domain (all FBG's have same wave length) modulated arrays contained in a single non-straight fiber in which the fiber is free to expand and/or contract within a non-straight tube irrespective of the tube material. The explanation for this error associated with any non-straight distributed fiber optic sensor dense packed FBG array or Rayleigh back-scattering or Brillouin frequency shift temperature strain analysis can be explained with the aid of FIGS. 4-5. In this illustration, an optical sensing single mode fiber 27 with or without embedded FBG's is shown within a curvilinear (non-straight) tube 28 and it is assumed that the optical fiber has sliding contact with tube surfaces, which would be the case in practice as it would be impossible to position the fiber along the centerline of the tube in a manner such that it never contacts the tube as the optical fiber and/or support tube expands and contracts due to temperature changes. The one exception would be a very large inside diameter tube many times larger inside than the fiber diameter (0.006 in), which is a typical diameter for a single mode polyimide coated optical fiber. However, diameter differences, fiber-to-tube inside diameter, of this magnitude are not practical and due to the flexibility of the small optical fiber it would defect under its own weight and contact the tube inside diameter. The large gap would also degrade the thermal performance of the optical fiber due to heat convection associated with a large annular gap, but more importantly, in a non-static environment which includes background vibration, the accuracy of Rayleigh back-scattering is compromised. Another factor is the newly documented electric charge differential that exists and is persistent between a plastic support tube and an optical sensing fiber. The mutual attraction causes the fiber to adhere to the plastic tube. Compromised temperature accuracy and the possibility of increased optical fiber vibration preclude the large annular gap option. Integration of the differential element shown in FIG. 4 results in the ratio of the optical fiber tensions at the ends of the curved tube to be equal to e (2.718) with an exponent equal to the positive product of the tube-to-fiber coefficient of friction multiplied by the subtended angle in radians. This result neglects the bending stiffness of the optical fiber which is very small. For example, assume the fiber-tube static friction factor is 0.05 and assume an optical fiber inside a tube with ten (10) loops for a total of 62.83 radians. Substituting these values into the tension ratio formula yields a tension ratio of about twenty three (23) which is additive to the standard friction due to the weight of the fiber. What this equation demonstrates is that when a non-straight plastic tube expands or contracts with temperature change, the plastic tube always moves more than the optical sensing fiber due to the lower coefficient of thermal expansion/contraction characteristics of the optical fiber. This relative difference in expansion is magnified by the non-straight (curved) sections of the fiber and supporting tube and is exponential with respect to the total subtended angle of the total curvature as measured in radians. This standard friction is quite small as a typical single mode fiber weights only 0.0000291 ounce per inch and with an assumed fiber-tube coefficient of friction equal to 0.05, the standard static frictional force would be 0.00000146 ounces per inch of fiber. In order to experimentally confirm the fiber optic tension ratio result described above, the friction test of a PTFE Teflon tube containing a single mode fiber is also included in FIG. 5. Impending motion in terms of the tension ratio of the single mode polyimide coated optical fiber as a function of the number of loops of single mode optical sensing fiber wrapped around a six (6) inch diameter drum is shown. A reasonably good fit to the experimental results for an optical fiber-to-PTFE-Teflon tube coefficient of friction value equal to 0.069, which is significantly larger than the 0.05 value commonly found in the literature. Part of this increase is due to a static charge that is generated between the optical fiber and Teflon tube as the fiber is inserted into the tube. In order to quantify the effect of static charge which occurs naturally as the optical fiber expands and contracts within the PTFE Teflon tube, an optical polyimide coated fiber was inserted into fifteen and one-half feet (15.5) of the composite tube described below. The composite tube was in the straight, horizontal condition and the force required to just cause movement of the optical fiber within the tube was measured and from this force and knowing the weight of the optical fiber, the coefficient of static friction can be calculated. The result was 10.1, which is an order of magnitude higher than the result above for the loop testing. Using this measured coefficient of friction for a polyimide coated single mode optical fiber inside a small (0.014 in. inside diameter) PTFE tube, the length of a straight section that could withstand a sliding pull from one end of the tube yields a tube length in excess of 5 miles which at the limit of full sliding motion of the fiber within the PTFE tube would produce a fiber differential elongation of almost 300 feet at the point of fiber failure. The same fiber failure can be achieved within the same PTFE tube for a relatively few number of full-circle loops, about nine (9). In the loop situation fiber breaking force can be achieved within a few feet, not miles, as compared with the straight fiber-in-tube situation. The difference can be explained by the much greater friction forces in the loop tests which mask the static charge frictional force and friction due only to the weight of the fiber, which are the only effects for the straight-optical-sensing-fiber-in-tube example noted. The potential temperature measurement error directly caused by the static electric charge and fiber weight for a fifteen and one-half (15.5) foot straight optical sensing fiber analyzed by means of Rayleigh back scattering is 2 degrees Centigrade, which is not insignificant, and for longer runs this would increase. It should also be noted that the persistence of the static electric charge was found to be significant as well. Samples of optical fiber placed in vertical Teflon tubes do not fall out of the Teflon tube and are held by the static charge which is sufficient to completely support the fiber weight until the charge differential is neutralized. For example, the same 0.006 in. diameter polyimide coated optical fiber was inserted in a much larger PTFE Teflon tube, one with a ⅛ in. outside diameter by 0.0625 in. inside diameter by sixteen and one half foot (16.5) length. This optical fiber tube combination was then suspended straight vertically. The force required to move the fiber in this vertical situation was measured as 0.0324 ounces, which, of course, is in addition to the force of the weight of the fiber itself, which is this case was 0.0058 ounces for a total force required to slowly slide the fiber downward of 0.038 ounces. In this vertical orientation, the combination of static charge and gravity in a fiber of this length is equivalent to about a 1 degree Centigrade temperature error per 16.5 feet, which would be additive for longer straight runs. There is also no easy method to cancel the charge imbalance between the optical fiber and the PTFE Teflon support tube in the electric generator application described herein and the relative motion between the optical sensing fiber and supporting tube maintains this charge differential. Both of these effects, friction and electrical charge are sources of errors in the optical temperature measured values.

The fiber-tube friction information noted above can now be explained as new material relevant to the accuracy of all distributed temperature/strain measuring systems when the optical fiber, with or without Fiber Bragg Grating arrays is arranged in a non-straight, curvilinear manner. When the fiber sensing array is non-straight experimentation has revealed very significant errors due to the extra optical fiber-tube friction caused by the non-straight segments. A second, non-negligible effect is the result of electrical charge force between the optical sensing fiber and the Teflon supporting tube. This force acts as an effective increase in the static and dynamic coefficient of friction between the optical fiber and its Teflon supporting tube by virtue of the attractive force which may well be a function of relative humidity within the electric generator. An error in temperature measurement also affects strain measurements as the strain value has to be corrected for the local temperature, so, in the general situation, the greater the total additive non-straightness, the greater the error in temperature, and temperature compensated optical strain readings. Commercial applications of the Brillouin methods, BOTDA, BODR, etc. have been used for long fairly straight runs such as pipelines, bridges, dams, highways, electric power transmission lines, intruder detection at national border crossings, transportation tunnels, etc. all of which would not require correction for non-straightness of the optical fiber 27 and conventional supporting tube(s) 28. In many of these cases a local temperature rise is all that is measured so the great length, possibly many kilometers, is not affected and has little effect on the far away point of measurement. As noted above this is not the case for the power plant generator application described in this invention.

However, these errors can be eliminated or greatly reduced by means of the invention improvements described herein, i.e., an article of manufactured such as a fiber optic sensor, generally designated as 60, essentially comprising composite support tube 62 having engineered coefficient of thermal expansion/contraction substantially equal to or very close to that of the at least one optical sensing fiber strand 27 freely contained for movement within the composite support tube 62.

Now, in reference to FIGS. 6-11, there are illustrated various forms and embodiments of the distributed fiber optic sensor 60 of the instant invention. In a particular reference to FIG. 6, the distributed fiber optic sensor 60 includes a composite member 62 manufactured from a combination of at least a pair of predetermined materials that have different characteristics. One (or first) of the pair of predetermined materials has a positive thermal expansion coefficient and an opposite one (or second) of the pair of materials has a negative thermal expansion coefficient. It is further preferred that a volume of the material having the positive thermal expansion coefficient is greater than a volume of the material having the negative thermal expansion coefficient. In one form, the volume of the material having the positive thermal expansion coefficient is about four times greater than the volume of the material having the negative thermal expansion coefficient. Conventionally, the composite member 62 is a tubular member with various cross-sectional shapes, as best shown in FIG. 20. Furthermore, such composite member 62 is provided as a non-conducting and a non-magnetic member.

Figure 6:
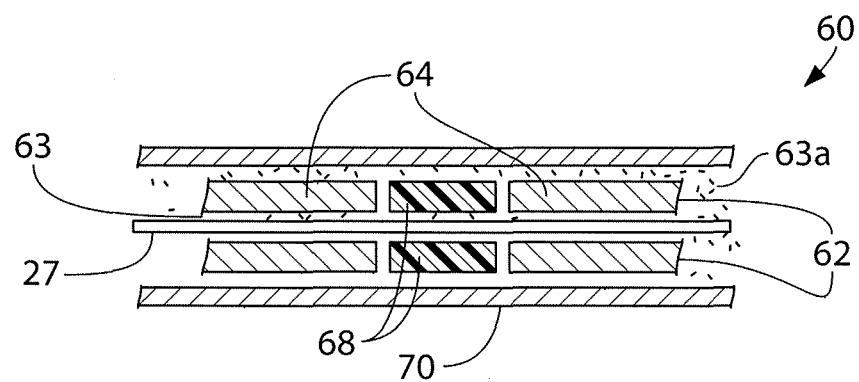
FIG. 6 illustrates one form of a distributed fiber optic sensor of the instant invention wherein at least one strand of optic sensing fiber is contained within the composite support tube.

In further reference to FIG. 6, at least one distributed optical sensing fiber strand 27 is disposed within a hollow interior 63 of the composite member 62. In the presently preferred embodiment, the cross-sectional shape of the hollow interior 63 is so sized that the at least one optical sensing fiber strand 27 is free to move there within even when the composite member 62 is bent or coiled. Essentially, the composite member 62 provides support for the at least one optical sensing fiber strand 27. It should be noted that hollow interior 63 may in certain applications of the composite support tube 62 be filled with a suitable liquid or gas dielectric material 63a.

Yet in further reference to FIG. 6, the instant invention contemplates that for fiber optic sensors 60 having a large length, the composite member 62 will be provided in sections or portions 64 separated by a gap 66, wherein the fiber optic sensors 60 will further contain an elastomeric resilient member 68, essentially functioning as a spring. The advantage of providing the sections or portions 64 is in accommodating thermal expansion or contraction during use.

Furthermore, when required by a specific application, the fiber optic sensors 60 will include a second member 70, preferably manufactured from a fluorocarbon based polymer material. A cross-sectional shape of a hollow interior 71 of the second member 70 is sized so as to encase the composite first member there within. The second member 70 may have an inner surface thereof disposed in a direct abutting contact with an exterior surface of the composite (first) member 62, but a spaced apart relationship of the interior surface of the second member 70 and the exterior surface of the composite (first) member 62 is presently preferred. In use, the second member 70 is secured to the structure under measurement and is free to expand or contract with such structure. However, the instant invention takes an advantage that the composite (first) member 62 will expand or contract independently from the second member 70. Alternatively, a groove 70a, best illustrated in FIG. 33, may be provided within the structure under measurement and sized to receive the composite member 62 therewithin, whereby the composite (first) member 62 will expand or contract within such groove 70a. It will be also understood that the groove 70a may be provided in addition to the second member 70.

Figure 7:
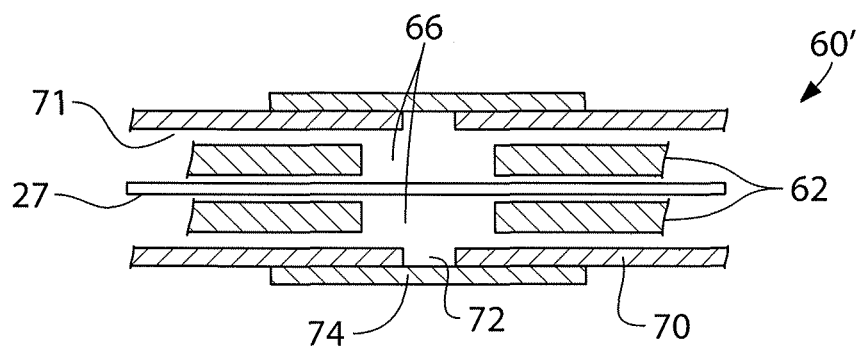
FIG. 7 illustrates a another form of a distributed fiber optic sensor, particularly illustrating a feature that permits temperature compensated strain measurements.
Figure 8:
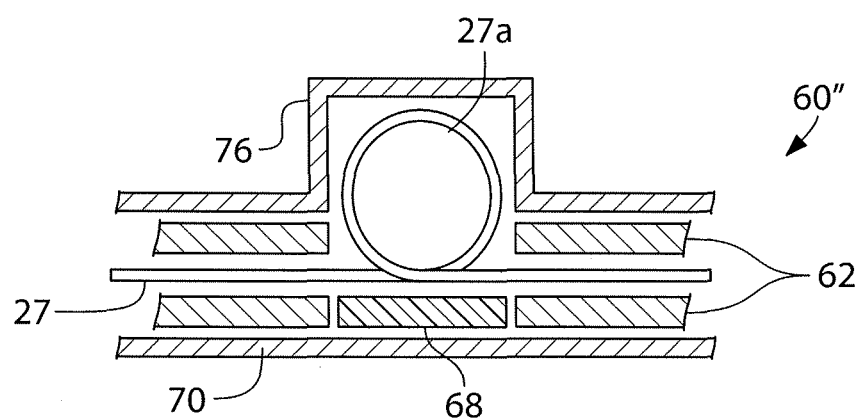
FIG. 8 illustrates yet another form of the distributed fiber optic sensor, particularly illustrating that a composite support tube member for a may incorporate an optional expansion joint for some long and non-straight runs.

Now in a particular reference to FIG. 7, it is also contemplated to section the second member 70 and include another member 74 sized to slide on the exterior surface of the second member 70. The advantage of this form is ability to directly fasten or bond the at least one optical sensing fiber strand 27 to the structure under measurement by sliding the third member 74 and exposing the gap 72 which is advantageously aligned with the gap 66 between portions of the composite member 62. The third member 74 is configured to act as a coupling and may be secured to the surface of the second member 70 with adhesive tape (not shown).

Now in a particular reference to FIG. 8, and as it will be explained later in this document, distributed fiber optic sensors 60 may also include an optional loop 27a in the at least one optical sensing fiber strand 27 and wherein the composite member 62 and a section 76 of the second member 70 being adapted to accommodate such loop 27a.

Now in a particular reference to FIG. 9, it is contemplated by the instant invention that each of the pair of materials is provided as plurality of elongated strands and wherein elongated strands 82 of the second material are intermeshed or interwoven with elongated strands 80 of the first material. In the presently preferred embodiment, it is further contemplated that such pair of materials 80 and 82 will be secured, either by etching process or by using adhesive 83, for example such as epoxy, to the exterior surface of a tubular member 81 manufactured from a material having a low coefficient of friction, for example such as Teflon or the like so as to minimize frictional forces during linear movement of the at least one optical sensing fiber strand 27 within the hollow interior 63. The tubular member 81 further affords installation of the composite member 62 with or without the second member 70 and then insertion of the at least one optical sensing fiber strand 27.

In a particular reference to FIG. 10, it is contemplated by the instant invention that each of the pair of materials is provided as an elongated strand and wherein elongated strands 82 of the second material are coiled, for example in a helical manner, around elongated strands 80 of the first material with the combination further secured to the exterior surface of a tubular member 81.

In a particular reference to FIG. 11, it is contemplated by the instant invention that the second material is provided as particles 86 that are imbedded within the first material 84, for example by an extrusion method. The tubular member 81 will be then provided as a third material that would be at least disposed on the interior surface of the resulting composite support member 62.

The method selected to minimize temperature errors in fiber optic distributed sensing measurements as well as distributed optical strain measurements, where the temperature is not known and must be measured optically, uses a composite non-conducting, non-magnetic composite support member 62 shown in FIGS. 6-11. This composite support member 62 is then contained in a slightly larger outer tube 70 or protective groove (not shown) added to the component to be measured. The design of the composite support member 62 is such that its composite coefficient of thermal expansion is designed or selected to match the coefficient of thermal expansion of the at least one optical sensing fiber strand 27 within the support member 62. With matching coefficients of thermal expansion of the composite support member 62 to the at least one optical sensing fiber strand 27, the friction between optical sensing fiber strand 27 and inside surface of the composite support member 62 is at least substantially reduced if not eliminated in its entirety for both straight runs and curved runs. By having the composite support tube 62 and at least one optical sensing fiber strand 27 within the composite support member 62 expand or contract in equal amounts at all locations along the at least one optical sensing fiber strand 27, the errors associated with electric charge attraction and increased friction due to non-straightness are eliminated or reduced to manageable values. Local bending and buckling of the at least one optical sensing fiber strand 27 is also at least substantially reduced if not eliminated as might occur without the composite support member 62 essentially supporting the at least one optical sensing fiber strand 27 as it expands or contracts due to local temperature variations. The composite support member 62 has much greater bending stiffness than the at least one optical fiber strand 27, generally by about a factor of 230 so that as it expands or contracts with local temperature change as long as there is adequate clearance between the composite support member 62 and outer support tube 70 or groove (not shown). The composite support tube 62 reduces optical fiber-support tube friction in a manner analogous to the way a shoe horn reduces insertion friction between a sock on a foot and leather shoe. Another general analogy is the composite support member 62 acts like a zero viscosity ideal lubricant that imparts no shear stress to the optical fiber outer surface as the optical fiber expands and contracts thereby minimizing the friction induced errors which, in turn, allows the optical fiber to measure local temperatures to nearly the same accuracy as free bare fiber in a controlled uniform temperature calibration oven. It should also be noted that the dimensions of the composite support member 62 and outer support tube 70 (or groove 70a) are very small so that local temperature measurement accuracy is satisfactory. The predetermined thermal properties of the materials and the size limitation means that very little heat is transferred along the distributed fiber optic sensor 60 which also minimizes the temperature error. Due to the small size and minimal mass of the composite tubes, thermal response time has been found more than satisfactory for measurement accuracy purposes.

As one example of selecting composite coefficient of thermal expansion, an acrylic coated optical fiber would have a different coefficient of thermal expansion than a polyimide coated fiber, or one that is coated with a metallic outer cladding, such as gold to choose one example. Furthermore, the coefficient of thermal expansion for optical fibers is not necessarily a constant and may change over the temperature range, which is another factor that enters into the design of the composite support member 62 that supports and guides the expansion/contraction of the at least one distributed optical sensing fiber strand 27, which is typically a single mode fiber with or without inscribed fiber Bragg gratings. In general, the coefficient of thermal expansion/contraction of at least one optical sensing fiber strand 27, depending on the outer protective coating is a good order of magnitude less than that of all flexible non-magnetic, non-conducting composite support member 62. By way of another example only, the coefficient of thermal expansion for the optical fiber is about 1.5(10)–6/F while it is 75(10)–6 for PTFE Teflon, an obviously huge difference and source of error for the reasons enumerated above. Therefore, if the at least one optical sensing fiber strand 27 is placed in a reasonable suitable PTFE Teflon tube and a number of wraps of the PTFE Teflon tube and integral fiber are wrapped around a drum, the frictional magnification effect described above tends to stretch the optical fiber more than it would expand from temperature alone creating the error in temperature measurement or if strain is measured and a section of the fiber in the PTFE tube is used for the temperature compensation, the calculated strain value is then in error.

The presently preferred rule for the effective modulus of elongation of the composite support member 62 is generally equal to the product summation of the modulus of elongation of each material component multiplied by the volume fraction of that material component. This calculation assumes that all the components are bonded together with a suitable bonding agent, such as epoxy, which implies equal longitudinal strain for each component of the composite support member 62. Now in further reference to FIGS. 9-10, assume that the low friction material of the inner tubular member 81 is Teflon and the material of outer composite tube fibers 80 and 82, which are bonded to the Teflon tubular member 81 by means of an etching process or adhesive (not shown), are composed of a mixture of fiberglass and Kevlar. The reason for the Kevlar (or similar material such as Zylon) will be explained briefly. Typical mechanical properties of these materials are shown in the TABLE 1 below.

TABLE 1

Mechanical Properties of a Typical Composite Tube for Supporting a Loose Optical Fiber

| Material | Elongation Modulus, E Lb./in./in. | Coefficient of Thermal Expansion, Alpha, /F | Poisson Ratio |
|---|---|---|---|
| Kevlar 29, F1 | 10.2(10) + 6 | –2.2(10) – 6 | 0.36 |
| Fiberglass, F2 E-Glass | 12.4(10) + 6 | 2.8(10) – 6 | 0.33 |
| Teflon, TEF | 80,000 | 7.5(10) – 5 | 0.46 |
| Epoxy, EP | 408,000 | 100(10) – 6 | Approx. 0.40 |

COMPOSITE TUBE RULES

V = Volume fraction of component
E(Composite tube) = E(F1)V(F1) + E(F2)V(F2) + E(TEF)V(TEF) + E(EP)V(EP),
where V(F1) + V(F2) + V(TEF) + V(EP) = 1
Alpha(Composite tube) = {Alpha(F1)E(F1)V(F1) + Alpha(F2)E(F2)V(F2) + Alpha(TEF)E(TEF)V(TEF) + Alpha(EP)E(EP)V(EP)}/E(Composite tube)

Values in TABLE 1 should be considered approximate and factors such as the Denier (weight of fiber in grams per 9000 meters) of the fibers bonded to the outer diameter of the Teflon tube are highly variable. For example, DuPont lists a tensile modulus for Kevlar 29 Denier as 12(10)+6 lb./in./in. and 18(10)+6 lb./in./in. for Kevlar Denier 49. The value for epoxy is for the cured condition. For the epoxy (or other suitable bonding agent) to be effective in impregnating the outer composite tube structural fibers, the viscosity has to be close to that of water in order to effectively wet and bond the outer fibers to the etched Teflon (or other suitable material) tube outer diameter. In applications in which the composite tube concept is used within the interior of the AC electric generator stator coil, the epoxy (not shown) would be applied to the composite tube 62 by vacuum impregnation in order to eliminate all voids. The important observation to make in regard to TABLE 1 is that values for the outer fibers 80, 82 and the epoxy dominate and completely control the elongation modulus of a thin-walled Teflon tubular member 81. Another point is that if the outer fibers 80 and 82 are not parallel to the tube centerline, as would be the case for the interlocking outer structure applied to the composite support tube 62, a modifying angle factor is applied to the composite elongation modulus formula. Typical values of this factor are about 1 for unidirectional, about 0.5 for biaxial, and about 0.25 for biaxial @+–45 degrees.

Composite tube coefficient of thermal expansion is a summation product of the component thermal expansion multiplied by the component elongation modulus and by the component volume fraction all normalized by the composite elongation modulus. The important result to note for this value is that a certain amount of Kevlar (or Zylon) must be included in the mix to draw down the composite tube coefficient of thermal expansion to a value which is close to the thermal expansion/contraction coefficient of the optical fiber. The negative coefficient of thermal expansion for the Kevlar makes the matching coefficients, optical fiber-to-composite-tube, possible. Zylon also has a negative coefficient of thermal expansion. In practice, for matching purposes, the composite support tube 62 samples are made with different fiber ratios, the at least one optical sensing fiber strand 27 is placed into the composite support member 62 and is secured to one end of the composite support member 62, the entire sample is then heated and the differential expansion/contraction of the optical sensing fiber strand 27 with respect to the composite support member 62 at the other end is then measured. If there is no differential expansion between the at least one optical sensing fiber strand 27 and the composite support tube 62, the volume fractions of the components are correct. The composite support member 62 may then be placed in a groove or inside of a larger tube 70. The second tube 70 may also be a composite tube but one having just enough annular clearance to allow the inner composite support member 62 to expand and contract therewithin. It is also possible to have each material component of the composite support member 62 made as a mixture of fibers by spinning Kevlar and fiberglass together as one roving of the correct ratio. It would also be possible to make a woven sleeve and impregnate that with Teflon as is shown in FIG. 11. Each embodiment of FIGS. 9-11 accomplishes the same goal of closely matching coefficients of thermal expansion/contraction, the at least one optical sensing fiber strand 27 to support member 62. The inner composite support member 62 by design has enough stiffness to move freely within the larger outer tube/groove subject to the limits noted below in regard to the need for expansion/contraction slip joints. It may also be helpful to attach the inner composite support member 62 to the outer tube 70 at certain key points so that the composite support member 62 does not ratchet within the outer tube 70 and jam itself to the outer tube 70 which could compromise the function of the composite tube. Use of the composite tube concept in which the optical fiber expansion/contraction coefficient is equal to that of the composite tube insures that the effective calibration constants of the optical fiber are maintained. Each section of the at least one optical sensing fiber strand 27 has a unique optical characteristic, which is the local variation of refractive index (density) along the fiber. This fiber specific position optical property is the source of the fiber baseline value is a constant for each optical fiber and is recorded in both the Rayleigh back-scattering and Brillouin Optical Time Domain Analysis Laser analyzers. The Luna Innovations DSS4600 analyzer can even identify the fiber by reading the baseline, a helpful feature if optical sensing fiber numbering locations are ever lost. This is true also for some versions of Brillouin analysis. All the methods make use of the baseline frequency shift (Brillouin) or phase shift (Rayleigh back-scattering) and really measure only deviations from those baseline frequency or phase shifts in order to ascertain the local strain/temperature changes. As noted earlier if the optical sensing fiber 27 is bonded to the component to be measured, either a second fiber or a section of the first fiber must be in close proximity and isolated from strain, in the case herein, contained within a suitable composite tube for the temperature compensation correction to be applied to the strain value. This is true for Rayleigh back-scattering as well. The only exceptions are the DPP-BOTDA (Developed by the Physics Department, University of Ottawa, Ontario, Canada), ribbon cable and, PCF (holley fiber). In regard to PCF, this fiber is also capable of simultaneous strain and temperature measurements with a single fiber and although it has not been tested for any of the applications described in this invention the possibility of eventual use exists as well as benefit from the methods described in this invention. The last three noted fibers, in general, would not require that Teflon be part of the composite tube, but matching the composite tube coefficient of thermal expansion to any of the three latter possibilities would certainly improve sensing accuracy of any distributed optical sensing fiber. The composite support tube approach also has the advantage that the same fiber can be read with both Rayleigh back-scattering and Brillouin Optical Time Domain Analysis laser analyzers. The embodiment described above for the through bolt load measurement (discrete FBG's and fiber optic thermocouples) is not the preferred embodiment but should be included for those operators of electric generators that are only interested in stator core tightness due to either past unit history or other factors beyond the scope of this invention. A more preferred embodiment is shown in FIG. 18, in which the fiberglass washer 22 is bonded to stainless steel through bolt 16 and through bolt insulation 19 enabling deployment of a single Rayleigh back-scattering or a Brillouin frequency shift distributed fiber optic sensor 60 as shown. It should be noted that the single distributed optical sensing fiber strand 27 traverses from one end of the through bolt 16 within a small composite thermally matched coefficient of expansion (matched to the optical fiber) non-metallic, non-conducting composite support member 62 the tube having internal diameter to allow free expansion and contraction with temperature change within a slightly larger outer tube 70. This tube 70 is installed under the outer layer of the through bolt Nomex insulation 19 and resides in close proximity to all the stator core electrical steel laminations associated with a given through bolt 16 and can therefore, measure the temperature of these thousands of stator core laminations identifying "hot spots" within the stator core. Also, with this design the through bolt applied load is measured with the fiber optic sensor 60 on one end of the bolt 16, as shown in FIG. 18 and the bolt 16 is then tightened at the other end so as not to disturb the fiber optic sensor cabling. In practice, a warning would be applied to the end with the fiber optic sensor cabling such as for example, "Do not apply torque to this end." Failure to heed this warning may crack the bond between fiber glass washer 22 and through bolt 16 thereby breaking fiber optic cable due to the large elongation which is applied to the through bolt in order to achieve the desired stator core tightness. Returning to the detailed construction, the composite support member 62 containing the at least one optical sensing fiber strand 27 is bonded to the fiberglass ring 25 at segment A-B. Segment B-C is exposed fiber (no tube) that is bonded directly to fiberglass ring 25 in order to measure the hoop stress in the fiberglass ring 25. Section C-D is also bonded to the fiberglass ring 25 and at point D it enters a groove milled into fiberglass washer 22 of sufficient cross-section so that the tube is not loaded during through bolt tightening. From point D on the tube is contained under the top layer of through bolt Nomex insulation 19. It should be noted that the tube then continues to the other end of the through bolt in a general unspecified path which is not necessarily straight line, making a U-turn at the distal end, returning back on the generally opposite side of the bolt, crossing over the fiber at point A and going somewhat parallel to segment BC and then curving down to point E at which point it exits the sealant 26 (not shown for clarity). Section A-E is also used for temperature compensation and would utilize the composite tube having the optical fiber matching coefficient of thermal expansion/contraction. It should also be noted that sections C-D and A-E could encircle ring 25 for enhanced load measuring accuracy. Once through bolt assemblies are inserted into the stator laminations, the distributed fiber optic cables would then be fusion welded together, which is the preferred method, or even linked together with mechanical fiber optic connectors. Measurements would then be made at zero load and in increments to full tightness. It is estimated that with the Rayleigh back-scattering method, four through bolts could all be linked by the same cable, for the Brillouin method about 30 through bolts 16 could be attached to one distributed fiber optic sensor 60 if desired.

FIGS. 21-24 identify some additional key electric generator components not previously numerically identified, to wit: stator wedge 30 which holds all stator core winding segments consisting of top coil segments 31*t* and bottom coils segments 31*b* tightly in the stator slots 32. Under each wedge are a series of flat fiberglass shims (not shown for clarity) and a single fiberglass ripple spring 33, one ripple spring for each stator wedge 30. At assembly the ripple spring is wedged (compressed) to a nearly flat condition resulting in several hundred psi pressure initially exerted onto the top coil segments 31*t* through intermediate spacer 34 and onto the bottom coil segments 31*b*. The intermediate spacer 34 may also contain RTD elements for measuring stator coil temperature. As noted below, shim 36 can be used as a substitute for the standard RTD element. Also semi-conducting side ripple springs 35 are installed between the sides of the top and bottom coil segments and one side only of the stator core slot 32. It is important to note that over years of operation, due to creep and relaxation of the spring and stator coil insulation, the ripple spring force degrades until pressure becomes low enough that the magnetic forces can cause the stator coil segments to start moving with respect to the stator core laminations, resulting in insulation abrasion followed by insulation failure and coil grounding. Therefore, knowledge of stator coil tightness is very useful information for those responsible for electric generator maintenance and continued safe operation.

Having identified key generator components another aspect of the invention can now be fully described. The flat shim not shown in FIG. 21 that is used in conjunction with the top coil ripple spring component is shown conceptually in FIG. 23. These fiber glass shims range in thickness from 0.007 inches to 0.19 inches and are used to make up for the manufacturing tolerances between the coils stack height and the slot depth. Typically they are about four feet in length. Item 36 represents a typical fiberglass shim. For application to this invention the shim length would be increased to slightly more than the total stator core slot length, which for large machines can be about twenty five 25 feet in length.

Figure 21:
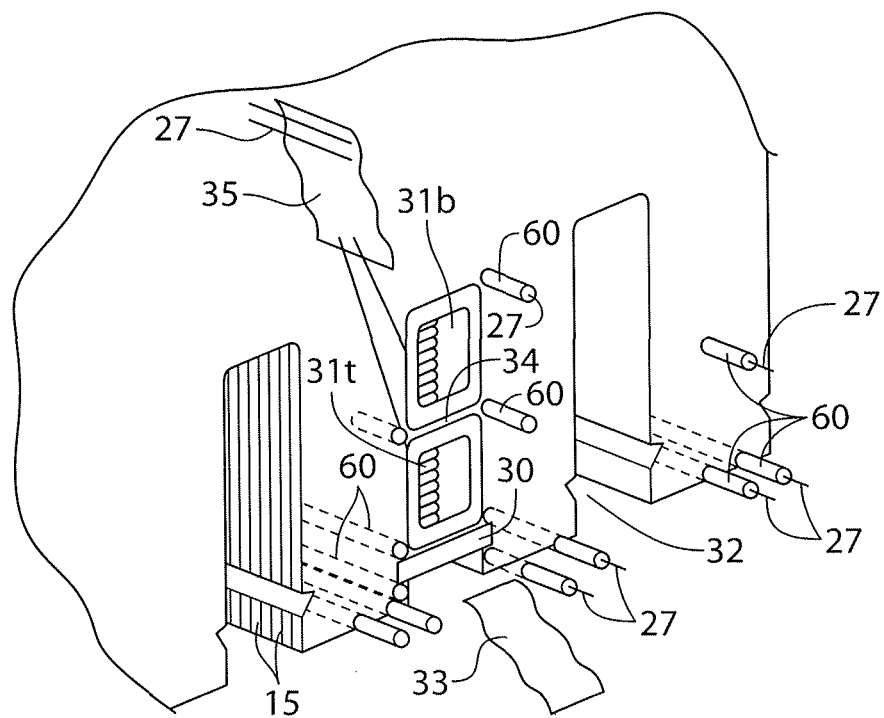
FIG. 21 is an end-view of the AC electric generator stator core slot portion showing top and bottom coils along with possible locations for fiber optic sensing composite support tubes and fiberglass shims containing these composite support tubes for the distributed optical sensing fiber.
Figure 22:
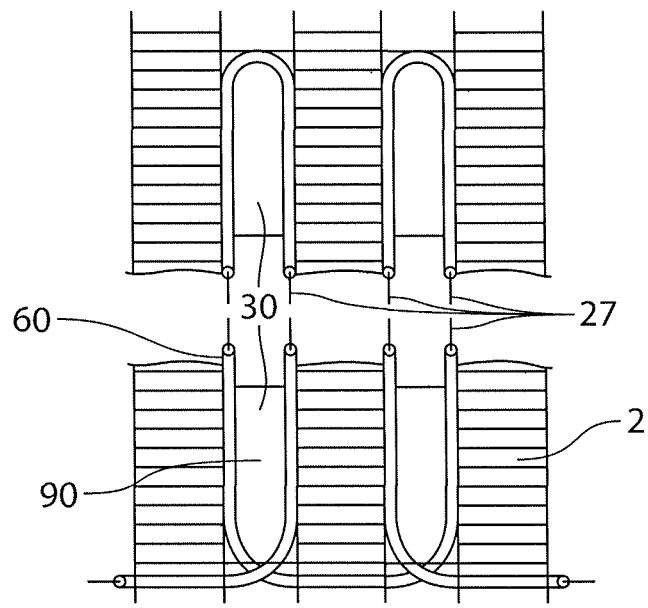
FIG. 22 shows one possible arrangement for a fully distributed fiber optic sensor composite support tube of FIGS. 6-11 when only the stator core wedges are accessible for modification.

Shims of this length can be either made in a special long press or constructed from segments joined together with lap joints. The means to monitor, either on-line or off-line, the tightness of the stator coil segments within the stator core as well as the condition of the stator core steel lamination electrical resistance is accomplished by means of special grooves milled into long fiberglass shims 36. FIG. 22 also illustrates a special case of the invention in which stator core electrical steel lamination tooth tops are to be monitored without major disassembly. In this application, a continuous distributed composite, thermally matched support tube for the distributed fiber optic sensor (cable) 60 is installed in a special groove 90 milled into the stator wedge thereby allowing the serpentine arrangement of the fiber optic cable to be bonded in this groove monitoring the tooth top temperatures during operation. This configuration of fiber would be well-suited to a stator tooth "hot spot" monitoring using Raman distributed fiber optic sensors, if only temperature were of interest, which, in this deployment might well be the cost-effective (but certainly not inclusive or even necessarily recommended) partial solution. Dense packed fiber Bragg gratings were first considered as the means to measure these two important parameters but the cost of writing the individual fiber Bragg gratings onto fiber optic cable in sufficient density to enable suitable measurements was not economically viable even though that approach could yield the required measurements. Test samples were then done to validate the use of Rayleigh back scattering and high spatial resolution version of the Brillouin method were tested and found to be viable and cost effective as well. For example, a meter of polyimide coated, low-bend loss, single mode fiber presently costs about $1.25, a tiny fraction of the cost of fiber Bragg gratings whether single or dense packed. The invention consists of special grooves added to the long shim which enable mechanical bending strains to be measured anywhere along the full length of the shim. These optical strain measurements are fully compensated for temperature as the stator coil segment in the stator slot varies in temperature from the cold end of the machine to the hot end and some units have zoned cooling which then requires further determination of the coils temperature within the zones in order to accurately measure the tightness of the coil segments within the stator slot portion of the stator core. Whatever method is used, Rayleigh back scattering or a version of Brillouin frequency shift, the part of the fiber that measures mechanical strain is carefully bonded to a special groove cut into the side of the fiberglass shim away from the top ripple spring. This is shown as the dotted line segment K-L in FIG. 23. Note that the groove has a radius bottom which gives the best possible bond between the shim 36 and the distributed fiber optic sensor 60. It is also important to note that the distributed fiber optic cable is properly bonded to the shim 36 when slightly below the surface of said shim. This precludes the optical fiber from experiencing any transverse loading, which as noted above is an important factor in reducing the data by eliminating the effect of birefringence due to loading. This fact is absolutely a key feature of the one Brillouin method that uses polarizing maintaining fiber and the natural birefringence property of this type of fiber to separate the strain measurement from the temperature measurement. If the fiber were loaded transversely, this method would not be possible. That would also be the situation with the other methods described above. A series of small fiberglass pseudo-parabolically shaped shims 37A and 37B are spaced on both sides of shim 36 such that their spacing equals the wave pitch of the fiberglass top ripple spring 33. The shims 37A on the top of shim 36 are one half wave pitch shifted with respect to shims 37B on the bottom. Also, the shims 37B shown underneath shim 36 have a relief 38 cut into them so they do not impose transverse loads onto the fiber optic distributed cable. The tops shims 37A do not require the special relief due to the thickness of shim 36. Both shims 37A and 37B can be applied in the proper position on 36 by coating each with contact adhesive. It should be noted that top coil ripple springs 33 have a range of spring rates from high to low as measured from the difference in their radial height from top to bottom. The ones with the largest radial deflection capability cannot be compressed totally flat without cracking and thereby degrading their useful function. For this condition it is recommended that top shims 37A not be used. Only bottom shims 37B would be employed. By this method shim 37B functions as a mechanical stop preventing over-compression of this particular widely-used style of top coil ripple spring 33. Whatever the spring rate of the top coil ripple spring the curving shape of shims 37A, 37B and their radial thickness, should be matched to the top ripple spring that is used so as to minimize stress concentration in the optical sensing fiber 27 and to make the spring rate of the shim 36 consistent with that of the to ripple spring 33. For example, the shape design of shims 37A and B should be such that when the top ripple spring is initially installed and compressed to the proper value, the shim 37B should be such that the deflection of the shim 36 is slightly less than the radial height of shim 37B. In any case, shims 27A and B can also be properly positioned on the thin adhesive plastic tape 40 as shown. The optical sensing fiber 27 supported by the composite support tube 62 having a coefficient of thermal expansion/contraction matching that of the at least one optical sensing fiber strand 27 than inters a groove that turns it to the outer edge of the shim where it then runs in a tiny groove at located at the neutral axis center of the shim. The composite tube and optical fiber within the composite support member 62 is not bonded in this region M-N but is free to expand and contract as a function of local stator lamination "tooth temperature." This portion of the at least one optical sensing fiber strand 27 is physically very close to the stator laminations and since the corners or all stator coils are rounded, as shown in FIG. 21, this portion of the fiber senses only the tooth temperature. Section O-P functions identical to M-N and is constructed identical to section M-N. It is also important to note that the fiber is located on the neutral axis of shim 36 which, therefore, insures that this portion of the optical fiber experiences no significant bending strain induced by action of shims 37A and 37B on shim 36. Sections M-N and O-P would be covered with adhesive tape 39a such as Kapton tape to maintain the composite tube (with internal optical sensing fiber) in the grooves. Alternatively, small tube, slightly larger than the composite support tube 62 could be bonded within the groove in order to contain the composite tube supporting the free optical sensing fiber within the composite tube, which eliminates the need for adhesive tape 39a. Composite support member 62 could also be attached to shim 36 by other means such as a helical cord arrangement. Once the fiber reaches position P it continues on inside another composite support tube 62 to the next shim 36 which would be an adjacent slot 32 in stator core 2. Starting at position Q proceeding to the far end of the shim 36 to position R, etc. Composite support member 62 would be secured to end turn stator coil 3 by suitable fiber glass banding tape, which would be a routine standard practice. The composite support member 62 would be banded on the side of the end turn stator coil to shield and protect it from damage. The composite tubing in this area could have a heavier wall as well to offer additional protection.

An additional feature shown in FIG. 23 concerns section S-T and U-V where the fiber leaves the side grooves and enters composite tubing contained within curving slots within shim 36. In these areas the temperature measured would be that of the stator coil ground-wall insulation, the same as is currently measured by the RTD segments. Any number of these special tubes within grooves can be added anywhere along the shim 36. Groove U-V is preferred as it does not subtract from measurement of tooth temperatures. Also, note that tube U-V and/or S-T may be located on either the top or bottom of shim 36, which would enable it to measure stator coil ground-wall temperatures of either the top or bottom coil ground-wall when shim 36 is located between top and bottom coils, for example. Should shim 36 be located between top and bottom coils is still performs the function of measuring stator coil tightness and all the required stator coil ground-wall and stator core electrical steel lamination slot temperatures required. Tests have shown that both the Rayleigh back scattering method and the Brillouin method based on birefringent polarizing maintaining fiber have sufficient spatial resolution to distinguish the temperatures in S-T or U-V from those measureable in the side groove attributable to stator core "tooth temperatures." It is also important to note that shims 36 could also be placed between top and bottom coils (Item 34 in FIG. 21) as well as at the bottom of slot 32 of FIG. 21. For these latter two instances, shims 37A and 37B could or could not be used. Shims 37A and 37B might not be used if they were part of shim 36 located on top of the top coil, or additional spring retention force/deflection could be obtained by locating shim 36 in both locations both with shims 36A and 26B. If shims 36A and 36B are not used shim 36 is not subject to bending with the result that the distributed fiber optic sensor or cable 60 would be used to measure only coil segment and stator core lamination temperatures in these two locations by means of either Rayleigh back scattering or Brillouin frequency shift analysis. By this means, the standard RTD measurement is no longer required having been replaced by the distributed fiber optic sensing cable, which also eliminates another grounding source with current means using the electrically conductive wires in the RTD's (resistance temperature detectors). A final observation about fiber sections Y and W is required. These sections are bonded to alternatively the top and bottom of shim 36, the transposition from top to bottom by means of the small slits shown so as to be of the same period and phase as the top ripple springs. By so doing all the fiber optic strain measurements for any given ripple spring are of the same sign, all positive or negative, which enables use of distributed fiber optic sensor systems with larger spatial resolution. By this means a single value of average strain can be obtained for each ripple spring if the spatial resolution of the fiber optic distributed laser analyzer is made equal to the axial length of the ripple spring.

Another attribute of the invention concerns possible application of U.S. Pat. No. 7,599,047, which is a special version of the Brillouin frequency shift in which temperature and strain are separated by using two single mode fibers of different index of refraction. Both fibers would be rigidly bonded to the fiberglass shim 36 and the ability to separate strain effects from temperature effects is completely dependent on the refractive index difference. In this later case shims 37A/37B would not be required as the top ripple spring is not used in this class of electric generators. For the birefringent version of the Brillouin analysis a minor modification could also be made to allow this version to be used with fully vacuum impregnated stator cores, and other options are noted below as alternative embodiments. In this version the small inner and outer composite tubes if they have the correct coefficient of thermal expansion/contraction, i.e., equal to that of the optical sensing fiber, could also be used for the full length of grooves S-T and U-V eliminating the need for covers 39a. The ends of the rubes at positions S, T, U, and V could then be sealed thereby allowing full vacuum impregnation without filling the composite support tube 62 with resin which would destroy their temperature measuring ability for those distributed optical sensing means requiring a freely movable distributed optical sensing fiber 27 within composite support member 62.

Figure 25:
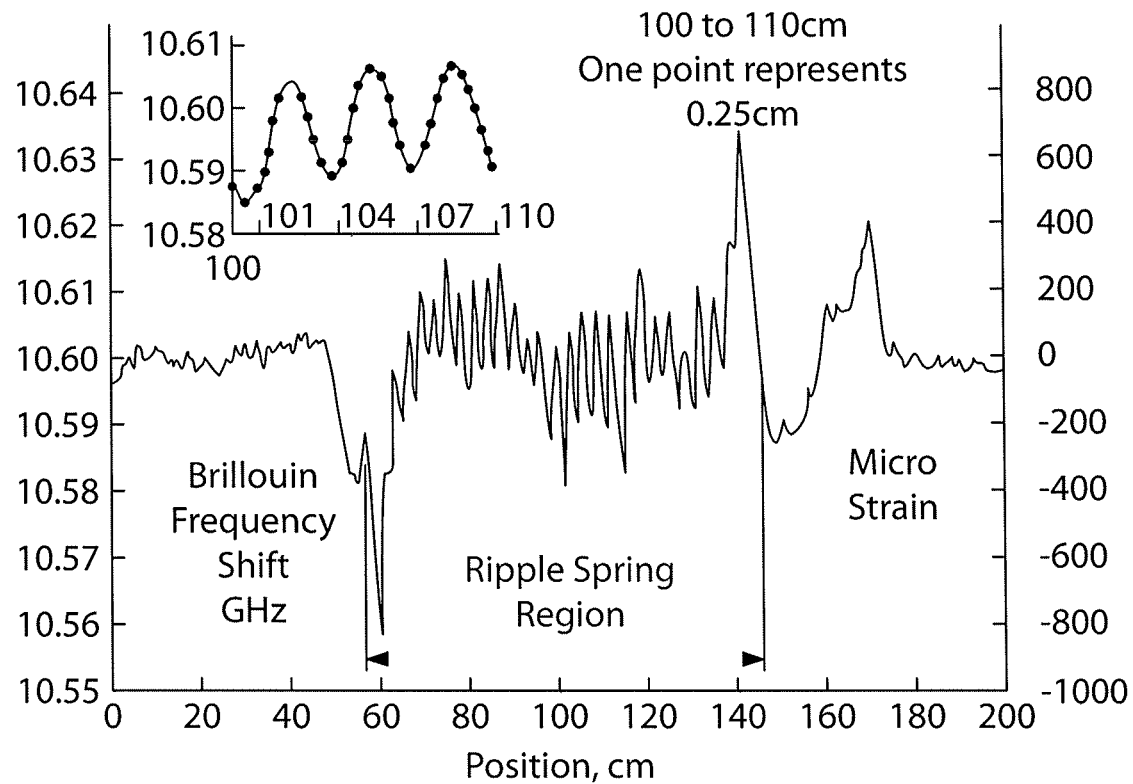
FIG. 25 illustrates one set of experimental results for AC electric generator modified stator core slot filler material instrumented with single mode optical sensing fiber and measured with the DPP-BOTDA method.
Figure 26:
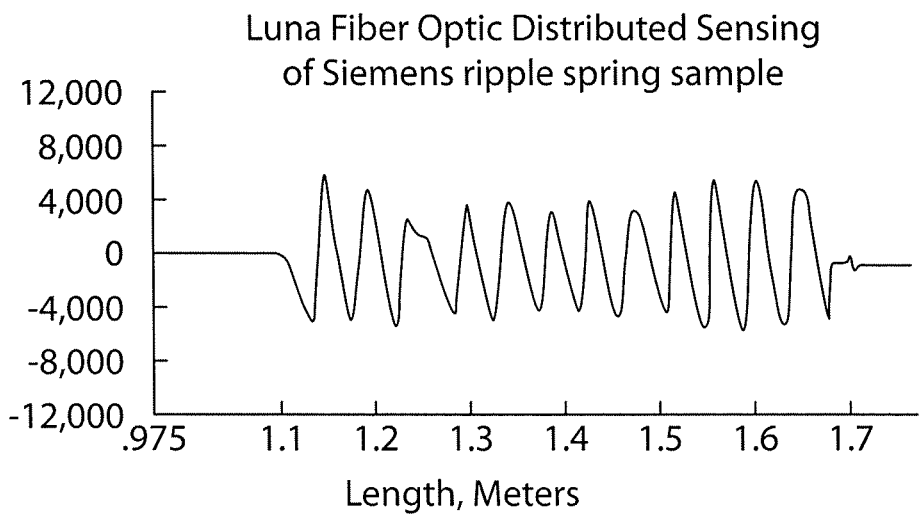
FIG. 26 illustrates another set of experimental results for AC generator modified stator core slot filler material instrumented with single mode optical sensing fiber and measured with Rayleigh back-scattering.

FIG. 25 presents experimental results of the invention using the Brillouin method of item 4 above, which was done by Professor Xiaoyi Bao of the University of Ottawa, Canada Physics Department and is the first time measurement of an electric generator top coil ripple spring strain as a function of the Brillouin frequency shift using the Differential Pulsed Pair Domain Analysis. Another curve, shown in FIG. 26, was obtained by means of the Luna Innovations Rayleigh FOS DSS 4600 instrument, which is based on Rayleigh backscattering (OFDR).

Another aspect of the invention is made in reference to FIG. 18 and the composite support tubes shown in FIGS. 6-11. As mentioned previously, the composite support tube 62 is both high temperature and high strength due entirely to the outer fiber coverings which are securely bonded to the plastic tubing. An important aspect of the invention is the design of the couplings 74. In further reference to FIG. 18, the coupling 74 can have a full range of length L from long to short as can gap G connecting tubing sections 28. Also, couplings 74 are sized so as to be moveable with respect to the composite support member 62. Couplings 74 would be initially held on the surface of the composite support member 62 with small pieces of adhesive tape 39.

Figure 27:
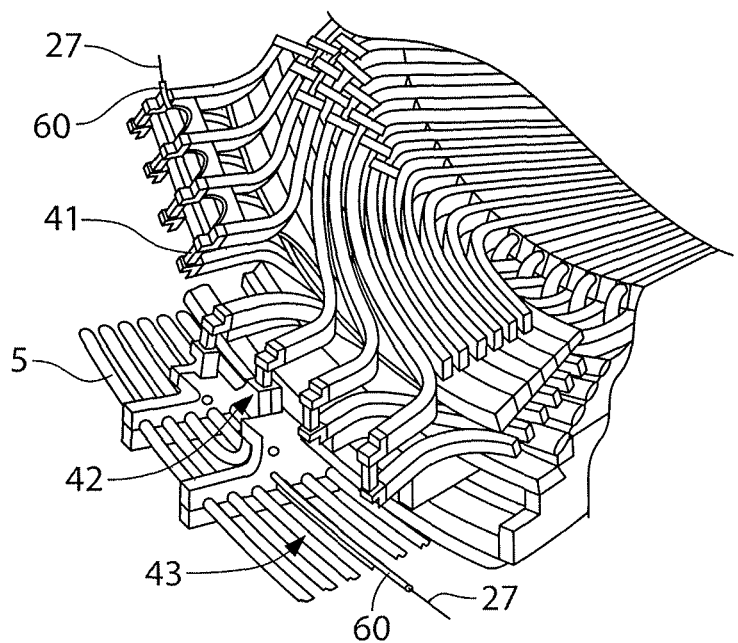
FIG. 27 illustrates the AC electric generator end region suitable for use with the composite fiber optic sensing support tube of FIGS. 6-11 for a fully distributed fiber optic sensing.
Figure 28:
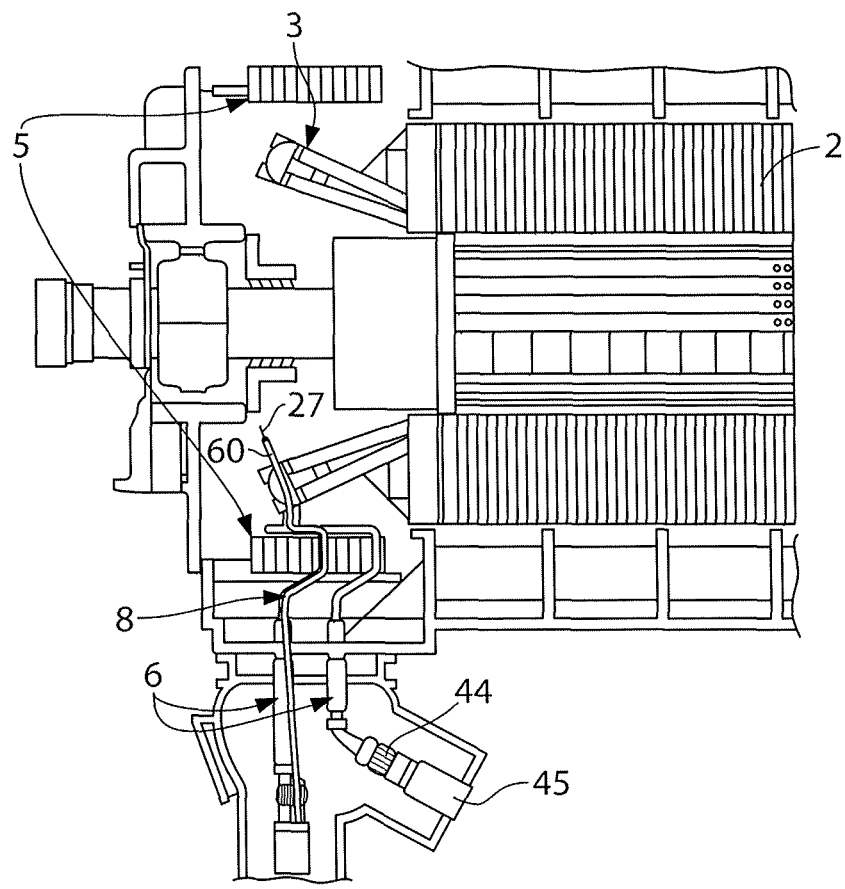
FIG. 28 is a cross-sectional view of an AC electric generator depicting the end region and main lead region and one possible routing pattern of the composite fiber optic sensing support tube of FIGS. 6-11 for a fully distributed fiber optic sensing.

During assembly in the generator these pieces of tape 39 would be removed thereby allowing the overall length of the support member 62 to be changed to either longer or shorter and/or the couplings can be moved so as to expose sections of distributed fiber optic sensor 60 which enables the at least one optical sensing fiber strand 27 to be directly bonded to generator components for the purpose of localized strain measurement. In addition, when coupling 74 is moved further onto the composite support member 62, a small tubing cutter can be used to cut through only coupling 74 without the possibility of damage to the at least one optical sensing fiber strand 27 contained within composite support member 62 effectively increasing the flexibility of positioning the location of exposed bondable sections of at least one optical sensing fiber strand 27. Several additional application approaches are illustrated in FIGS. 27-28. The first example concerns series electric generator series connections 41. An illustrative section of composite support member 62 having the proper coefficient of thermal expansion/contraction is shown in direct contact with one side of a series connection, looping around the bottom, and then proceeding up the opposite side of the series connection onto a nearby support ring from which the distributed fiber optic sensor 60 proceeds to the next series connection, etc. Were the connection a phase connection 42, distributed fiber optic sensor 60 could then proceed to monitor the local temperature of said phase connection 8 and proceed on to monitor parallel ring temperatures and in particular the temperatures of brazed parallel ring copper connectors 43. From the parallel ring segments, fiber optic sensor 60 could also continue on to the main lead 6 and flexible connectors 44 or possibly even main bushings 45. At all of these locations the composite support member 62 would be bonded to the various components utilizing standard winding techniques. As noted above, composite support tube sections 64 can be sealed with the appropriate adhesive rendering the inner diameters "air tight" for their full expanse by appropriate leak testing means. These composite support tube sections and the hollow space 63 could also be filled with an insulating gas such as sulfur hexafluoride 63a in applications where there is a concern about partial discharge suppression. Partial discharge may occur in the generator due to voids between copper and insulation or voids in the insulation. Due to high voltage present, these voids cause voltage gradient over the void resulting in a current flow across the void and further resulting in heating and possibly sparking action. If the problem is not suppressed, the insulation decays will cause generator failure. The voids would also affect the tubular members 62 and 70 surrounding the at least one optical sensing fiber strand 27 and may potentially result in damage thereof. Transformer oil would also suppress partial discharge and is an optional tube filling material 63a. Then the composite support member 62 itself could contain a fiber optic sensor (FBG) which would be written on the single mode fiber allowing precise location and temperature calibration or a very local strain measurement. This can only be done with the BOTDA (or other Brillouin) as the FBG would compromise the measurements made with Rayleigh back-scattering. This provides the added capability of the at least one optical sensing fiber strand 27 contained within composite support member 62 and tubing couplings 74 to be fully applicable to vacuum impregnated electric generators. The use of transformer oil in place of the SF6 would also be practical and would prevent partial discharge within the composite support member 62 in all situations where partial discharge is a concern. The possibility of using the dual index of refraction method, one fiber for strain, and a second of different refractive index, both encased in suitable high temperature special composite tube devoid of Teflon is described above. And, again certain conditions and generator history might recommended that the Ramon distributed fiber optic multi-mode cable be used within the composite tube with optimum coefficient of thermal expansion/contraction when only temperatures are of interest.

Figure 29:
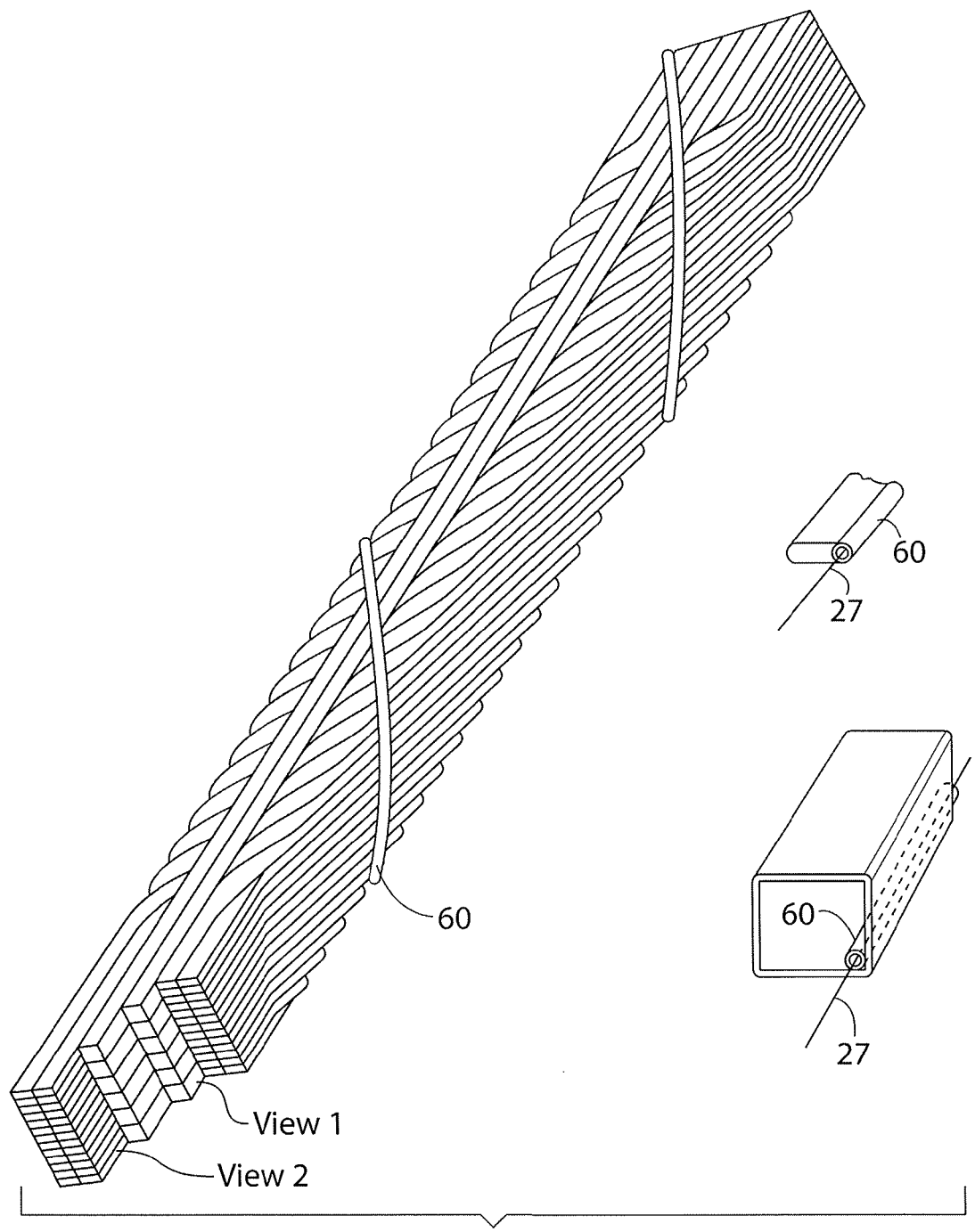
FIG. 29 illustrates a straight section an AC electric generator stator coils with the insulation removed in order to particularly illustrate possible routing patterns suitable for the composite fiber optic sensing support tube of FIGS. 6-11.

The composite thermally matched support member 62 having a coefficient of thermal expansion/contraction equal to that of the at least one optical sensing fiber strand 27 freely contained within the outer tube 70 has special application to the electric generator stator coil winding in it can be placed within the copper structure underneath the mica stator coil groundwall insulation as is shown in FIG. 29.

In order to correct for the temperature measurement error associated with non-straight sections of optical sensing fiber irrespective of whether the fiber contains wave length modulated or time of flight analyzed FBG's, in which each FBG has the same wave length, or an optical fiber suitable for Rayleigh back-scattering or Brillouin analysis, all these various methods would be subject to the error caused by the non-straight sections and the only known exceptions have been noted above as DPP-BOTDA, "ribbon cable", and PCF, photonic crystalline fiber. These last three examples, can, in theory, be bonded directly to the component to be measured and still yield strain and temperature values anywhere along the optical sensing fiber. However, these optical sensing fibers must be protected and the instant invention of composite support member 62 provides the required protection.

Another aspect of the invention, a system for monitoring the operating condition of an electric generator consisting of a stator core, windings within the stator core portion, and a plurality of stator coil ends, turbine end and exciter end, both integral with the stator coil portions, and all the numerous electrical connections located in the turbine end and connector end, is a means to measure with a single distributed fiber optic cable all the mechanical strains and temperatures at any location along this distributed fiber optic cable. The distributed fiber optic sensor 60 preferably would not use Fiber Bragg gratings as described in U.S. Pat. No. 8,076,909 but would contain a polyimide coated single mode or polarizing maintaining fiber and would be simulated and controlled by a distributed fiber optic laser system employing either the Rayleigh (OFDR) method or one of the many Brillouin methods enumerated above. As noted previously the polarizing maintaining option is not currently the low-cost embodiment but could become so as laser analyzer costs are reduced. The feature of the invention improvement described herein for monitoring all the generator electrical connections, whether they be phase, series, parallel ring connections would employ the composite tube configuration and the thermal matching coefficient of expansion/contraction principle describe above as all of the electrical connection fiber optic sensing cable runs would be of the non-straight design as was shown in the Detailed Description. Non-magnetic, non-conducting couplings 74 in FIGS. 7 and 20 are used to join sections of this tubing 70 together thereby enabling long sections up to hundreds of meters in total length to be easily assembled, which when assembled in the electric generator allow measurement of mechanical strain or temperature at every point along the entire length. This is possible by means of the couplings connecting sections of the composite support member 62 shown in FIGS. 6-11. If mechanical strain is desired, the distributed Rayleigh or Brillouin fiber would exit the composite tube and be bonded directly to the desired electric generator component for a short distance, the fiber would then reenter the tube for whatever desired distance, yielding temperature within those regions. The mechanical couplings have a second function, that of providing a slip joint, i.e., expansion/contraction relief, for the composite tube with respect to the outer tube. The bending stiffness of a typical composite tube is approximately 230 times greater than the optical sensing fiber within the composite tube. Tests have shown that if the composite support member 62 subtends a cumulative bend of more than three turns (6×3.14=18.84 radians) friction between the composite support member 62 and outer tube 70 becomes too high and can restrict the free movement of the composite support member 62 within the outer tube 70 (or groove should the groove be non-straight) which then effects the movement of the at least one optical sensing fiber strand 27 supported by the composite member 62. This effect is eliminated by incorporating one of the typical slip joint constructions, as shown in FIG. 7. The designs shown in FIGS. 6-8 are not meant to be all inclusive as other designs could be developed. If long straight runs are used the slip joints can be relatively far apart, and somewhat closer for the case for the curved (non-straight) sensing situation. For very long runs of composite tubing the service loop 27a shown in FIG. 8 might also be required depending on the substrate to which the outer tube 70 which freely supports the composite support member 62 or the groove (not shown) in the component to be measured which could also freely support the composite support member 62. The other possibility is to use the version of the Brillouin having different indices of refraction one for the strain fiber, a second fiber with a different index of refraction for the temperature fiber with the fibers fused together at the distal end. A version of the composite member 62 would then contain the dual index optical sensing fiber, which is commonly referred to as "ribbon cable". Of course, Rayleigh back-scattering could also be used with the coupling concept to expose sections of fiber that could be directly bonded to winding components and those sections of fiber within the composite tube structure would be analyzed for temperatures. An additional feature of this composite thermally matched tube structure containing the distributed fiber optic cable is that the open ends and the couplings can be sealed and pressure tested, which makes the system an ideal for the class of vacuum impregnated generators described above and a valuable augmentation to the fiber Bragg grating point sensors described in U.S. Pat. No. 8,076,909. A Brillouin based "SMARTape" is advertized and sold by Omnisens SA of Lausanne, Switzerland. This is mainly for civil engineering applications and due to its construction as a tape it would not edge bend effectively and on a flat bend, the minimum bend radius of the Brillouin distributed fiber could be compromised resulting in breaking the fiber or excessive bend loss. The design of the composite tubing described below is very flexible and ideally suited to be attached to the complex and highly variable geometries found in electric generators. Also, it is not known if the Brillouin fiber is sealed and, therefore, suitable for vacuum impregnation in the "SMARTape" design nor is it known if it could withstand the inward pressure associated with vacuum impregnation, which the composite tubes described herein are ideally suited to successfully resist The composite support tube distributed sensing structure herein described improves sensing accuracy equivalent to that obtainable with the fiber Bragg grating point sensor. Of course, the latter is limited to points only which itself is a major limitation. Dense packed fiber Bragg gratings can see more of the optical fiber, but the real advantage in scope is using the concepts herein noted with Rayleigh back scattering and/or one of the Brillouin frequency shift methods.

All measurements within the scope of this invention are to be made with distributed fiber optic sensors, which can be a series of Fiber Bragg gratings either wave length modulated or time domain modulated, Rayleigh backscattering sensors and/or Brillouin frequency shift sensors, the selection of the appropriate method, where it possible to specify, is enumerated herein. It must be noted that the Fiber Bragg grating with wave length multiplexing would, in general, only be considered for the stator core tightness measurement as the number of wave length modulated FBG's that can be inscribed on a single fiber is rather limited. All other measurements would be preferably done with either the Rayleigh back-scattering or the Brillouin frequency shift analysis. A special application of Ramon temperature fiber optic back-scattering sensing is also proposed. All fiber optic sensors and the fiber optic cables associated with said sensors are designed and of sufficient sensing length to exit through the machine frame and be gathered as a grouping into a small sealed box (with removable cover), hereafter referred to as the "fiber box", located appropriately on the outside of the machine, where all optical fibers can then be grouped and connected to the appropriate fiber optic sensor analyzer, whether it be for dense packed Fiber Bragg Grating cable(s), Rayleigh back-scattering sensing cable(s), Brillouin frequency shift sensing cable(s), or Raman distributed temperature sensing cable(s). Furthermore, the various fiber optic sensor laser analyzers may be intermittently connected as needed to the appropriate fiber optic cable located within the fiber box, or they may connect to a standoff fiber optic cable that enables the fiber optic sensor laser analyzer to be located in the control room of electric generator. Whether measured at the generator, in the control room, or via the internet to a remote site, fiber run configurations within the generator can be changed and reconfigured within the temporarily open but also sealable fiber box. This reconfiguration is necessary to take advantage of different spatial resolutions and variations in dynamic and static capabilities in association with different Rayleigh, Brillouin, or Raman distributed fiber optic sensor laser systems that might be employed as needed. Wherever, the various fiber optic sensor analyzers are located, the choice of intermittent versus continuous "on-line" fiber optic sensor measurement and analysis would then be decided as needed, based both on machine history in the case of a retrofit of various fiber optic sensor options and/or on the amount of protection desired for the particular electric generator. For example, a large electric generator as might be found at a nuclear plant might be best served by continuous "on-line" fiber optic sensor measurement in view of the enormous economic consequences of a forced outage, which might necessitate all the options described herein in addition to those made available and fully described in U.S. Pat. No. 8,076,909, as the fiber optic sensor 60 of the instant invention is a direct augmentation to the teachings of U.S. Pat. No. 8,076,909 incorporated in this document by reference thereto.

It should be noted that the presently preferred embodiment is somewhat different for a new factory machine versus field rewound units or field units that undergo only a re-wedge (stator coil tightening procedure). Obviously, in each case the amount and location of fiber optic cable that can be installed is somewhat different but does not detract from the spirit and scope of the current invention.

First considering the requirement to maintain sufficient stator core electrical steel inter-laminar pressure and the means required to measure such pressure, a fiber optic distributed load cell is proposed as a means to eliminate the need to measure such pressure with hydraulic means consisting of hydraulic torque wrenches or hydraulic tensioning devices. If, for example, the fiber optic distributed load cell is selected as the only part of this invention needed, for reasons beyond the scope of this patent application, then the logical choice of fiber optic sensors would be the wave modulated distributed fiber Bragg grating. Conversely, if additional parts of the invention are selected such as the measurements associated with the tightness of each and every stator wedge or the electrical resistance of each electrical steel stator core lamination, then the Rayleigh distributed fiber optic sensor would be required. In that situation, the Rayleigh distributed fiber optic sensor would be used to quantify the mechanical clamping forces applied by the building bolt and through bolt clamping means so that a common distributed fiber optic sensor laser analyzer could be used for all measurements associated with the integrity of the stator core. In addition, the Rayleigh distributed fiber optic sensor could be used to measure all electrical connection temperatures within the winding as an augmentation to the vibratory measurements enumerated in U.S. Pat. No. 8,076,909. The Rayleigh distributed fiber optic system is not currently capable of vibratory analysis, but that additional capability is under development by Luna Innovations of Blacksburg, Va. The location of the distributed fiber optic sensor laser analyzer would ideally be located in the control room of the electric generator. The distance between the electric generator and the control room varies from plant to plant and there can be up to 100 yards separating the electric generator and its control room. Since the Rayleigh distributed fiber optic sensor system proposed by Luna has a maximum fiber length of 70 meters and their "standoff" i.e., fiber optic link concept has not yet been tested. This implies that in the general case the distributed fiber optic sensor laser analyzer could not always be located in the control room. (Other Rayleigh fiber optic sensors systems have a reach in the 2 kilometer range but these have larger numbers for the minimum spatial resolutions and are, therefore, may not suitable for the top ripple spring measurement associated with stator coil tightness.) Therefore, for this option the distributed fiber optic laser analyzer would, of possible necessity, be located near the side of the generator within an environmentally controlled chamber. This would only be for the condition where continuous or semi-continuous measurements are required. All the other options with the possible exception of the Luna Rayleigh (OFDR) method would permit the distributed fiber optic sensor laser analyzer to be located in the electric generator control room.

Before continuing with additional information concerning the selection of the appropriate distribute fiber optic sensor system, it is important to note that one embodiment of the invention utilizes the birefringence properties of a polarizing maintaining fiber. In one version of the Brillouin, it is the property of birefringence that allows the simultaneous determination of temperature and strain from a single fiber. Birefringence in optic fiber can be generated by applying transverse pressure to the fiber, i.e., pressure loads in a generally perpendicular manner to the centerline of the fiber. Excessive fiber bending can also produce birefringence. Since the property of birefringence is utilized in this temperature strain separation it is highly important the mechanical design and function of the distributed fiber optic sensor not alter the natural birefringence of the polarizing maintaining fiber. For this reason use of this method requires special measures so as to not introduce birefringence which would be produced by transverse loads (pressures) on the fiber at any region associated with the sensing region. A second embodiment is an application of the distributed fiber optic sensor means described in U.S. Pat. No. 7,599,047 which utilizes two distinct single mode fibers, each having a unique and different refractive index but with a common and connected light path. This refractive difference then enables the separation of mechanical strain and temperature using the algorithms enumerated in U.S. Pat. No. 7,599,047 issued to Zou et al. on Oct. 6, 2009. Teachings of U.S. Pat. No. 7,599,047 are incorporated into this document by reference thereto. The implication for this invention is that the distributed fiber optic cable, whether for temperature or strain, can be rigidly affixed (bonded) to the electric generator component, in this case, the thin fiberglass shim fillers used in all electric generators constructed to take up the gap tolerances which are necessary for the stator coil to fit into and be secured to the generator stator core slot. This version the two distinct fibers could be enclosed within the invention described herein and then bonded to various generator components in order to measure both strain and temperature. Using this version of the Brillouin would enable measurement of stator coil top ripple compression, individual stator core electrical steel lamination temperatures, and stator coil temperatures within the entire slot portion, all with one rugged fiberglass shim with the distributed fiber optic sensor cables rigidly attached (bonded) within this invention and subsequently bonded to the electric generator component. This is embodiment of the invention is also described herein. The essential features of the invention relative to the stator core and winding portions within said stator core are that modifications are made to existing components essential to the construction and assembly of the electric generator stator core windings within the stator core that are such as to permit detailed monitoring of key strains and temperatures with addition of distributed fiber optic sensors which with other known data for these components, such as load deflection curves for the top coil ripple spring, can be used to predict the remaining life of the stator core and winding remaining life, and electrical steel inter-laminar resistance as well as the point at which stator coil looseness could be a problem. In the case of stator core electrical steel inter laminar electrical resistance, this evaluation can be done by simply periodically monitor the temperature of each of the thousands of steel laminations, and by monitoring the winding within the core by monitoring the stator coil temperature at every point within the full length of the stator core. Stator coil tightness is inferred by measuring the remaining compressive force associated with each of the thousands of top ripple springs and by comparing these distributed measured strains to known strain load curves for the top ripple springs. Over extended periods of electric generator operation, the holding force exerted by the top coil ripple springs inevitably drops off due to creep in the stator coil ground-wall insulation and creep within the copper stranded Roebling structure of the coil (See FIG. 29) and this can be detected by direct measurement of the force exerted by each top coil ripple spring. The ripple springs are highly stressed and tend to have some internal creep as well; however the design of the fiberglass shim containing the distributed fiber optic sensors is stressed only in the elastic region and, therefore, is able to provide the force exerted by each top coil ripple spring. Some electric generator constructions do not use top ripple springs but they still use the fiberglass shims as fillers. The invention has application in this situation as well as the trending tightness of the stator coils within the stator core slots is totally measurable by means of the invention regardless of the presence or absence of top coil ripple springs. Finally there is a class of electric generators in which the entire stator core and associated windings are fully vacuum impregnated which fills all the small gaps and voids between the windings and the stator core slots thereby creating a homogeneous very rugged composite structure. However, these electric generators also usually have the non-grounded stator core so a single short between two continuous electrical steel stator laminations cannot be detected with EL-CID. Two shorts between these laminations would have to be present and separated by some distance for EL-CID to be able to detect the problem, but if two shorts are in proximity to one another they are undetectable by EL-CID with the floating core design, which places the stator core steel inter-laminar resistance as measured by EL-CID in the "false negative" category. Therefore, the instant invention applies for this class of machines as well, as EL-CID is not effective and cannot detect all the hot spots that could be present during operation in this floating core design, which makes the instant invention very useful with this configuration of electric generator stator core.

Figure 31:
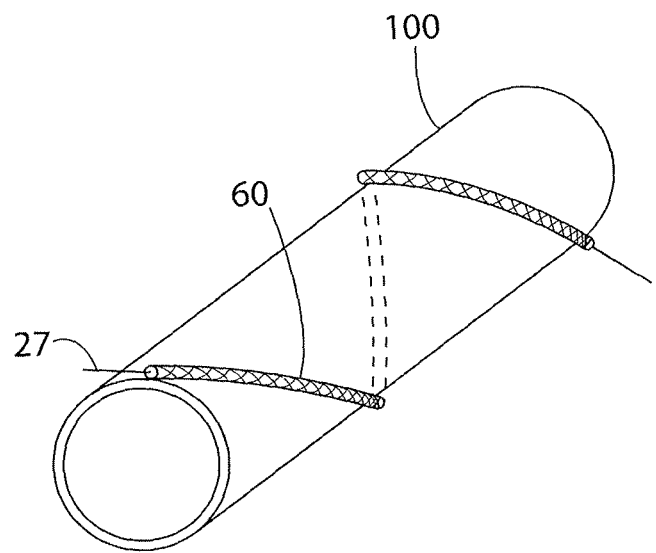
FIG. 31 illustrates the composite fiber optic sensing support tube of FIGS. 6-11 in combination with a pipeline in a non-straight pattern for increased sensing coverage and improved sensing accuracy.
Figure 32:
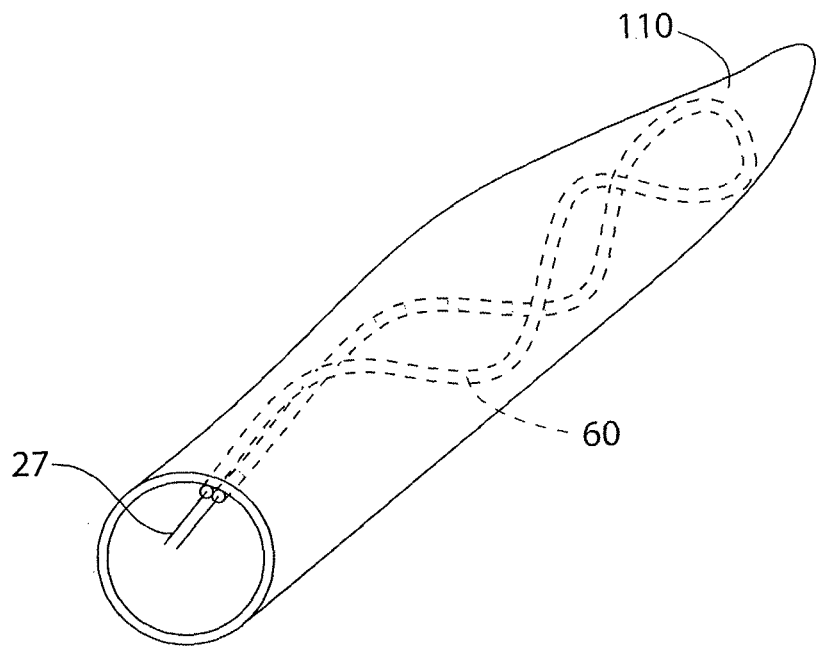
FIG. 32 illustrates the composite fiber optic sensing support tube of FIGS. 6-11 in combination with a large fiberglass wind turbine blade and the possible non-straight fully distributed sensing pattern.

Although the present invention has been shown in terms of the large AC electric generator, it will be apparent to those skilled in the art, that the present invention may be applied to other devices or structures. By way of one example, FIG. 31 shows a pipeline 100 and FIG. 32 shows a wind turbine blade 110. Both of these examples currently often make extensive use of distributed optical sensing. For the pipeline 100, BOTDA is the usual method of choice due to its extraordinary sensing length, up to 150 kilometers. The wind turbine blade 110 will often use Rayleigh back scattering to measure local strains in the turbine blade material 110 as its fine spatial resolution and superior strain sensing ability along with adequate fiber length, typically up to seventy (70) meters, make that method an ideal choice for distributed measurements of temperature and strain within or on the wind turbine blade 110. Measurement and coverage for both examples could be improved by using the above described distributed fiber optic sensor 60. It is contemplated that for the pipeline 100, a helical pattern of fiber optic sensor would give better coverage when temperature change due to a leak is to be found. It would also be very convenient to run a second fiber next to the composite tube section (not shown) which would be connected to the pipeline 100 so as to indicate strain. Having a good temperature value from the composite tube section would yield a better strain measurement which could be of great value in measuring pipe wall thinning more comprehensively than is currently done. The same improved measurement for the wind turbine blade 110 irrespective of whether the fiber optic sensor 60 is on the surface or buried in the fiberglass material. Improved temperature readings result in improved strain readings and the composite support member 62 allows complete flexibility in the fiber orientation which, in turn, permits a much more comprehensive picture of the distribution of temperatures and strains within (or on) the wind turbine blade 100.

The above described concept is also suitable to improve prior art devices based on some form of point optical sensor such as a discrete Fiber Bragg grating. BY way of one example, U.S. Pat. No. 8,098,967 issued on May 17, 2012 to M. Bazzone and entitled "Generator Protection System" teaches an array of double fiber Bragg gratings which operate as laser amplifies between gratings with identical wave lengths. It should be noted that the optical fiber between the Fiber Bragg grating array will expand and contract with temperature changes and can thereby affect the optical parameter readings obtained from the double fiber Bragg grating arrays. For this reason the methods and accuracy of the Bazzone patent could be greatly improved by incorporating the fiber optic sensor 60 and, more particularly, composite support member 62 concept described herein. The other prior art devices, in general, employ single point sensors located at the end of a fiber optic cable and would not be subject to errors but would have the limitation that they only give data at a single point and not along the full expanse of the optical fiber as described in the invention herein. For example, U.S. Pat. No. 6,721,470 issued on Apr. 13, 2004 to T. Bosselmann discloses test data from a collection of Fiber Bragg gratings, each with a separate optical cable, placed under the stator coil mica groundwall electric insulation. This work presents a series of point fiber optic sensors, individual FBG's and does not utilize either Rayleigh back-scattering or Brillouin frequency shift techniques. Other prior art reference of note include U.S. Pat. No. 7,379,632 issued on May 27, 2008 to M. Twerdochlib; U.S. Pat. No. 7,174,075 issued on Feb. 6, 2007 to O. Drubel; U.S. Pat. No. 6,886,977 issued on May 3, 2005 to C. Kaminski; U.S. Pat. No. 6,587,188 issued on Jul. 1, 2003 to W. Glein; U.S. Pat. No. 5,760,516 issued on Jun. 2, 1998 to T. Baumann; and U.S. Pat. No. 5,550,629 issued on Aug. 27, 1996 to V. Shapanus. Teaching of all these patents are incorporated into this document by reference thereto.

Figure 30:
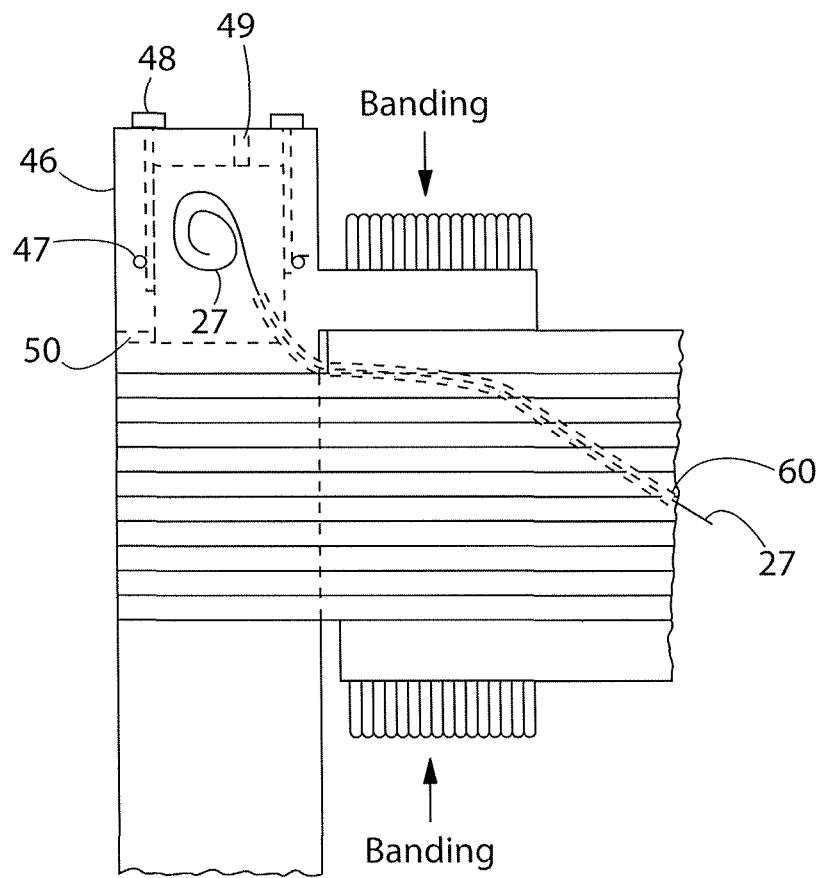
FIG. 30 illustrates an end region of a typical AC electric generator stator coil with the addition of a non-magnetic, non-conducting fiber optic sensing fiber hermetically sealed box which would be used to contain the end of the composite fiber optic sensing support tube of FIGS. 6-11.

In all of the above patents no mention is made of the effects of non-straight fiber optic sensor runs in regard to sensing accuracy. Nor is mention made of the effect of electrical charge on fiber optic sensing accuracy. Therefore, the instant invention described herein, specifically, the thermally matched composite support tube method is contemplated as an improvement in sensing accuracy. The structural fiber reinforcement applied to the non-conducting non-magnetic tubes also provides a very useful way to create a fiber channel after the stator coil is vacuum impregnated and cured at temperature. The optical sensing fiber 27 can be inserted after the stator coil is cured and could even be installed after the stator coil is wound into the electric generator. The dielectric material 63a can also be applied (pumped in) after the AC electric generator stator coil 31t or 31b is fully cured. The fiber optic sensor 60 can be mounted on the outside of the copper stack as shown or it can be bonded to a vent tube as shown if the stator coil design employs stainless steel insulated vent tubes. For electric generators windings that do not have vent tubes, a groove can be added to a copper strand as shown in FIG. 29. Whatever method is selected, the improved temperature measuring accuracy of the composite tube is a highly desirable feature of the method. To aid in fiber installation a small non-conducting, non-magnetic box 46 can be added to one or both ends of the stator coil to accept and store the fiber or fiber optic connectors should a series run be desired. This concept is shown in FIG. 30. The box 46 can be easily secured to the stator coil by any number of conventional banding techniques. Is should also be noted that some stator coil designs have brazed end connections which would apply to much heat to the composite tube design described above. In this case a short lend of stainless steel tubing can be attached to the ends of the composite tube. If a brazing operation is required the optical sensing fiber could then be installed after brazing is complete. The stator coil end fiber box would be sealed and bolted at a parting by means of o-ring 47 and bolts 48. It would also have an access port 49 into which SF6 gas could be introduced as well as a sealed exit port 50 where the optical sensing fiber 27 could exit and be supplied with an optical connector or fused to additional fiber optic sensing cable.

Additionally, the distributive fiber optic sensor 60 can be employed in other applications requiring measuring of strain and/or temperature, particularly in application of fasteners.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. An article of manufacture comprising:
   (a) a first member manufactured from a material having a positive coefficient of thermal expansion or contraction;
   (b) a second member in a contact with said first member and manufactured from a material having a negative coefficient of thermal expansion or contraction; and
   (c) a third member having a hollow interior and wherein said first and second members are secured in a predetermined pattern to an exterior surface of said third member.

2. The article of manufacture, according to claim 1, wherein a volume of said material having said positive coefficient of thermal expansion or contraction is greater than a volume of said material having said negative coefficient of thermal expansion or contraction.

3. The article of manufacture, according to claim 1, wherein each of said first and second members is provided as plurality of strands.

4. The article of manufacture, according to claim 3, wherein said plurality of strands of said first member are interwoven or intermeshed with said plurality of strands of said second member.

5. The article of manufacture, according to claim 1, wherein said predetermined pattern is one of interwoven or intermeshed.

6. The article of manufacture, according to claim 1, wherein said third member is manufactured from at least one of a thermoplastic and a fluorocarbon material characterized by a low coefficient of friction.

7. The article of manufacture, according to claim 1, further including another member having a hollow interior and wherein said first, second and third members are disposed within said hollow interior.

8. The article of manufacture of claim 1, further including at least one optical sensing fiber strand, wherein said third member defines a hollow interior and wherein said hollow interior is shaped and sized to receive said at least one optical sensing fiber strand therewithin.

9. The article of manufacture of claim 8, wherein a combined thermal characteristic of said first and second members is configured to closely match a thermal characteristic of said at least one optical sensing fiber strand.

10. The article of manufacture of claim 8, further including a generator of electric energy having a frame, a stator mounted stationary within said frame and a rotor mounted for rotation within said stator, wherein said article of manufacture is mounted within or in a close proximity to said stator and wherein said article of manufacture communicates at least one of Rayleigh back-scattering, Brillouin frequency shift and Raman distributive characteristics of an optical signal traveling through said at least one optical sensing fiber strand.

11. The article of manufacture of claim 8, further including a structure, wherein said article of manufacture is mounted within or on a surface of said structure and wherein said article of manufacture communicates at least one of Rayleigh back-scattering, Brillouin frequency shift and Raman distributive characteristics of an optical signal traveling through said at least one optical sensing fiber strand.

12. The article of manufacture of claim 1, wherein said first and second members are combined to define a tubular shape of said article of manufacture.

13. A distributed fiber optic sensor comprising:
   (a) a tubular shaped member manufactured from a combination of a pair of materials, one of said pair of materials having a positive coefficient of thermal expansion or contraction and an opposite one of said pair of materials having a negative coefficient of thermal expansion or contraction; and
   (b) at least one optical sensing fiber strand disposed within a hollow interior of said tubular shaped member.

14. The distributed fiber optic sensor of claim 13, wherein a volume of said material having said positive coefficient of thermal expansion or contraction is about four times greater than a volume of said material having said negative coefficient of thermal expansion or contraction.

15. The distributed fiber optic sensor of claim 13, further including another tubular shaped member manufactured from a thermoplastic or fluorocarbon polymer material characterized by a low coefficient of friction.

16. The distributed fiber optic sensor of claim 15, wherein said tubular shaped member is disposed within a hollow interior of said another tubular shaped member.

17. The distributed fiber optic sensor of claim 15, wherein said tubular shaped member is secured to an exterior surface of said another tubular shaped member.

18. The distributed fiber optic sensor of claim 13, wherein each of said pair of materials is provided as plurality of strands and wherein plurality of strands of one material are intermeshed or interwoven with plurality of strands of another material.

19. The distributed fiber optic sensor of claim 13, further including at least one of a liquid or gaseous dielectric material disposed within said hollow interior of said tubular shaped member, said at least one of liquid or gaseous dielectric material suppresses electrical discharges produced by a high magnetic field when said distributed fiber optic sensor is being exposed to said high magnetic field.

20. A sensor configured to detect compressive stress generated by a fastener, said sensor comprising:
   (a) a fiber optic cable including a member having a hollow interior, at least one optical sensing fiber strand disposed within said hollow interior of said member and a close match between a thermal characteristic of said member and a thermal characteristic of said at least one optical sensing fiber strand;
   (b) a washer manufactured from a compressive material and positioned to receive said fiber optic cable and the fastener therethrough; and
   (c) wherein said washer is being responsive to a force applied by the fastener to change at least one characteristic of an optical signal traveling through said fiber optic cable.

21. The sensor of claim 20, wherein said member is defined by sections or portions separated by one or more gaps and wherein said sensor further comprises an elastomeric resilient member positioned in each of said one or more gaps.

22. The distributed fiber optic sensor of claim 13, wherein said distributed fiber optic sensor is configured to communicate at least one of Rayleigh back-scattering, Brillouin frequency shift and Raman distributive characteristics of an optical signal traveling through said at least one optical sensing fiber strand.

23. The distributed fiber optic sensor of claim 13, further comprising dense packed Fiber Bragg Grating arrays on said at least one optical sensing fiber strand.

* * * * *